US012240090B2

(12) United States Patent
Ferris et al.

(10) Patent No.: US 12,240,090 B2
(45) Date of Patent: Mar. 4, 2025

(54) INSERT FOR PALM STAPLER, A PALM STAPLER AND A METHOD OF USE THEREOF

(71) Applicant: Brahma Industries LLC, Jackson, WY (US)

(72) Inventors: Mark Ferris, Jackson, WY (US); Eric A. Miller, Jr., Wellesley, MA (US); John D. Fiegener, Marblehead, MA (US); Marcus R. Hanna, South Boston, MA (US); Ryan Thompson, Somerville, MA (US); William P. Liteplo, Middleton, MA (US)

(73) Assignee: BRAHMA INDUSTRIES, LLC, Jackson, WY (US)

( * ) Notice: Subject to any disclaimer, the term of this patent is extended or adjusted under 35 U.S.C. 154(b) by 0 days.

(21) Appl. No.: 18/350,983

(22) Filed: Jul. 12, 2023

(65) Prior Publication Data

US 2023/0347488 A1 Nov. 2, 2023

Related U.S. Application Data

(62) Division of application No. 16/793,635, filed on Feb. 18, 2020, now Pat. No. 11,806,854.

(Continued)

(51) Int. Cl.
*B25C 7/00* (2006.01)
*B25C 5/15* (2006.01)

(52) U.S. Cl.
CPC . *B25C 7/00* (2013.01); *B25C 5/15* (2013.01)

(58) Field of Classification Search
CPC ........... B25C 7/00; B25C 5/15; B25C 5/1648; B25C 1/06
See application file for complete search history.

(56) References Cited

U.S. PATENT DOCUMENTS 2,170,287 A * 8/1939 Kinnebrew ........ H01R 13/6205 439/690
2,330,575 A * 9/1943 Grauding .................. B25C 1/02 227/147

(Continued)

OTHER PUBLICATIONS

Makita, Makita XTS01Z 18V LXT Crown Stapler, www.amazon.com/Makita-XTS01Z-18V-Crown-Stapler/dp/B00U2LVX3A, 7 pages, publicly available as of Aug. 22, 2017.

(Continued)

*Primary Examiner* — Thomas M Wittenschlaeger
*Assistant Examiner* — Katie L Gerth
(74) *Attorney, Agent, or Firm* — Sand, Sebolt & Wernow Co., LPA

(57) ABSTRACT

A battery-operated palm stapler, an insert for holding a fastener, and a method of installing a fastener using the palm stapler. The stapler includes a housing with a telescoping barrel extending outwardly therefrom. An insert is engaged in the barrel's bore and is held in place by magnets. The insert body defines a slot for receiving fasteners therein. The slot extends from a top wall of the body to a bottom wall thereof. At least one magnet is provided in the body adjacent the slot and is used to hold fasteners in a correct orientation for installation. A sensor probe provided in the body is operable to detect if voltage is carried in electrical cables adjacent which fasteners are to be installed. The probe deactivates a hammer actuating mechanism if voltage is detected. Inserts holding different types of fastener may be selectively engaged with the palm stapler.

17 Claims, 20 Drawing Sheets

Related U.S. Application Data

(60) Provisional application No. 62/807,592, filed on Feb. 19, 2019.

(56) References Cited

U.S. PATENT DOCUMENTS

| | | | | | |
|---|---|---|---|---|---|
| 2,829,369 | A * | 4/1958 | Browning | B25C 1/001 | 227/113 |
| 4,349,143 | A | 9/1982 | Ewig | | |
| 4,903,882 | A * | 2/1990 | Long | B25C 3/006 | 227/147 |
| 4,953,774 | A | 9/1990 | Lai | | |
| 5,004,140 | A | 4/1991 | Fushiya et al. | | |
| 5,054,678 | A * | 10/1991 | Nasiatka | B25C 7/00 | 227/8 |
| 5,074,453 | A * | 12/1991 | Tachihara | B25C 1/043 | 227/119 |
| 5,118,023 | A | 6/1992 | Fushiya et al. | | |
| 5,581,862 | A * | 12/1996 | Choma | F16L 13/161 | 29/33 K |
| 5,735,444 | A | 4/1998 | Wingert | | |
| 5,868,048 | A * | 2/1999 | Cassutti | B25G 1/085 | 81/439 |
| 6,006,704 | A | 12/1999 | Phillips et al. | | |
| 6,016,946 | A | 1/2000 | Phillips et al. | | |
| 6,308,879 | B1 * | 10/2001 | Wang | B25C 1/00 | 227/119 |
| 6,481,612 | B1 * | 11/2002 | Mangone, Jr. | B25C 5/00 | 227/140 |
| 6,598,775 | B1 * | 7/2003 | Chen | B25C 7/00 | 227/119 |
| 6,805,272 | B1 * | 10/2004 | Sen-Mu | B25C 1/04 | 227/113 |
| 6,971,567 | B1 | 12/2005 | Cannaliato et al. | | |
| 7,137,541 | B2 | 11/2006 | Baskar et al. | | |
| 7,165,305 | B2 | 1/2007 | Kenney et al. | | |
| 7,225,959 | B2 | 6/2007 | Patton et al. | | |
| 7,322,506 | B2 | 1/2008 | Forster | | |
| 7,445,139 | B2 | 11/2008 | Okouchi | | |
| 7,494,035 | B2 | 2/2009 | Weaver et al. | | |
| 7,527,106 | B2 | 5/2009 | Miller et al. | | |
| 7,537,145 | B2 | 5/2009 | Gross et al. | | |
| 7,556,184 | B2 | 7/2009 | Brendel et al. | | |
| 7,641,089 | B2 | 1/2010 | Schell et al. | | |
| 7,646,157 | B2 | 1/2010 | Cruise et al. | | |
| 7,665,540 | B2 | 2/2010 | Gross et al. | | |
| 7,793,811 | B1 | 9/2010 | Pedicini et al. | | |
| 7,913,890 | B2 | 3/2011 | Gross et al. | | |
| 7,918,374 | B2 * | 4/2011 | Gardner | F16B 15/0015 | 227/5 |
| 7,938,305 | B2 | 5/2011 | Simonelli et al. | | |
| 7,975,893 | B2 | 7/2011 | Berry et al. | | |
| 8,011,549 | B2 | 9/2011 | Berry et al. | | |
| 8,025,197 | B2 | 9/2011 | Brendel et al. | | |
| 8,079,504 | B1 | 12/2011 | Pedicini et al. | | |
| 8,123,099 | B2 | 2/2012 | Kenney et al. | | |
| 8,167,183 | B2 | 5/2012 | Matsunaga et al. | | |
| 8,210,409 | B2 | 7/2012 | Hirabayashi | | |
| 8,215,528 | B2 | 7/2012 | Matsunaga et al. | | |
| 8,225,978 | B2 | 7/2012 | Gross et al. | | |
| 8,231,039 | B2 | 7/2012 | Buck et al. | | |
| 8,302,833 | B2 | 11/2012 | Gross et al. | | |
| 8,387,847 | B2 | 3/2013 | Hachisuka | | |
| 8,413,867 | B2 | 4/2013 | Gardner et al. | | |
| 8,439,242 | B2 | 5/2013 | Tanji et al. | | |
| 8,453,901 | B2 | 6/2013 | Suda | | |
| 8,459,372 | B1 * | 6/2013 | Collins | B23B 45/00 | 173/217 |
| 8,523,035 | B2 | 9/2013 | Pedicini et al. | | |
| 8,534,527 | B2 | 9/2013 | Brendel et al. | | |
| 8,550,323 | B2 | 10/2013 | Fujimoto | | |
| 8,631,986 | B2 | 1/2014 | Hlinka et al. | | |
| 8,690,036 | B2 | 4/2014 | Schell et al. | | |
| 8,690,582 | B2 * | 4/2014 | Rohrbach | G06F 1/18 | 439/39 |
| 8,698,022 | B2 | 4/2014 | Kawakami | | |
| 8,733,610 | B2 | 5/2014 | Pedicini | | |
| 8,800,834 | B2 | 8/2014 | Pedicini et al. | | |
| 8,875,969 | B2 | 11/2014 | Pedicini et al. | | |
| 8,899,460 | B2 | 12/2014 | Wojcicki | | |
| 8,939,340 | B2 | 1/2015 | Gardner et al. | | |
| 8,939,341 | B2 | 1/2015 | Pedicini et al. | | |
| 8,939,342 | B2 | 1/2015 | Brendel et al. | | |
| 8,985,424 | B2 | 3/2015 | Miyashita | | |
| 9,346,157 | B2 | 5/2016 | Morioka et al. | | |
| 9,346,158 | B2 | 5/2016 | Garber et al. | | |
| 9,399,281 | B2 | 7/2016 | Brendel et al. | | |
| 9,425,730 | B2 | 8/2016 | Sako et al. | | |
| 9,469,021 | B2 | 10/2016 | Gregory et al. | | |
| 9,486,904 | B2 | 11/2016 | Gregory et al. | | |
| 9,486,905 | B2 | 11/2016 | Baskar et al. | | |
| 9,498,871 | B2 | 11/2016 | Gregory et al. | | |
| 9,577,493 | B2 | 2/2017 | Ekstrom et al. | | |
| 10,926,385 | B2 * | 2/2021 | Myers | B25C 1/008 | |
| 2002/0134811 | A1 * | 9/2002 | Napier | B24B 23/04 | 227/134 |
| 2002/0162978 | A1 * | 11/2002 | Butler | B25H 1/0078 | 250/559.33 |
| 2008/0054043 | A1 * | 3/2008 | Beales | B25C 1/00 | 227/129 |
| 2008/0230435 | A1 * | 9/2008 | Cope | A63B 57/20 | 224/245 |
| 2009/0321495 | A1 | 12/2009 | Hirabayashi et al. | | |
| 2010/0065294 | A1 | 3/2010 | Hirabayashi | | |
| 2010/0089969 | A1 * | 4/2010 | Fukinuki | B25C 1/06 | 227/147 |
| 2010/0225075 | A1 * | 9/2010 | Hecht | B25B 23/12 | 279/128 |
| 2011/0203824 | A1 * | 8/2011 | Elger | B25C 5/15 | 173/205 |
| 2012/0111915 | A1 | 5/2012 | Miyashita | | |
| 2013/0098963 | A1 | 4/2013 | Gardner et al. | | |
| 2013/0200129 | A1 * | 8/2013 | Paddock | B25C 11/00 | 227/63 |
| 2013/0300333 | A1 | 11/2013 | Sako et al. | | |
| 2013/0320060 | A1 | 12/2013 | Gregory et al. | | |
| 2013/0320063 | A1 * | 12/2013 | Gregory | B25C 1/001 | 227/139 |
| 2013/0320064 | A1 | 12/2013 | Gregory et al. | | |
| 2013/0320066 | A1 | 12/2013 | Gregory et al. | | |
| 2013/0320067 | A1 | 12/2013 | Gregory et al. | | |
| 2014/0001224 | A1 | 1/2014 | McNeill et al. | | |
| 2014/0097223 | A1 | 4/2014 | Baron et al. | | |
| 2014/0158740 | A1 | 6/2014 | Akutsu et al. | | |
| 2015/0096776 | A1 | 4/2015 | Garber | | |
| 2015/0122868 | A1 | 5/2015 | Campbell | | |
| 2015/0298308 | A1 | 10/2015 | Kato | | |
| 2015/0343582 | A1 * | 12/2015 | Ebihara | B23B 31/28 | 279/128 |
| 2016/0241178 | A1 | 8/2016 | Fujinami et al. | | |
| 2016/0359343 | A1 | 12/2016 | Ito et al. | | |
| 2017/0060471 | A1 | 3/2017 | Yamamoto et al. | | |
| 2017/0129085 | A1 | 5/2017 | Miyashita et al. | | |
| 2017/0217004 | A1 | 8/2017 | Kato | | |
| 2019/0202044 | A1 * | 7/2019 | Arbuckle | A47G 1/205 | |
| 2020/0039047 | A1 * | 2/2020 | Keister | B25C 7/00 | |

OTHER PUBLICATIONS

Arrow Fastener, Cordless Electric Staple Gun-T50DCD, www.homedepot.com/p/Arrow-Fastener-Cordless-Electric-Staple-Gun-T50DCD/300126668, 2 pages, publicly available as of Aug. 22, 2017.

* cited by examiner

INSERT FOR PALM STAPLER, A PALM STAPLER AND A METHOD OF USE THEREOF

REFERENCE TO RELATED APPLICATIONS

This application is a Divisional of U.S. patent application Ser. No. 16/793,635 filed Feb. 18, 2020, which claims the benefit of U.S. Provisional Application Ser. No. 62/807,592 filed Feb. 19, 2019, the entire disclosures of which are incorporated herein by reference.

TECHNICAL FIELD

This disclosure relates generally to power tools. More particularly, the disclosure is directed to a power tool used for installing fasteners. Specifically, this disclosure relates to an insert engageable with a palm stapler to accept a plurality of different types of fastener, to a palm stapler that receives such an insert, and to a method of use of the insert and palm stapler.

BACKGROUND ART

Installing fasteners by hand may be time consuming and, in some situations, quite difficult. This is particularly true when installing a fastener into a work surface that is in an awkward location or is made of a particularly hard or strong material. Screwing in a screw with a handheld screwdriver in confined spaces for example, may be time consuming and challenging. If a lot of screws have to be installed, using a handheld screwdriver may be extremely tiring. Nails may be installed by striking the same with a handheld hammer but in tight spaces, wielding a hammer can prove difficult. Staples, such as those that are used to secure electrical cables, may be installed using a hammer or a handheld staple gun. Tight spaces make using a hammer or staple gun challenging.

A number of power tools have been proposed in the prior art to make fastener installation more convenient. For example, power drills may be used to install screws, electric staple guns may be used to install staples, and electric nail guns may be used to install nails. In some instances, these electric tools accept magazines of fasteners and may be used to rapidly install those fasteners. However, the tools that accept magazines of fasteners are often too large to fit into tight spaces and therefore cannot be used for all fastener installations. Devices such as palm nailers and palm staplers have been developed that are useful in these situations. These devices are able to be held in the palm of the operator's hand and may be used to install a single fastener at a time.

SUMMARY OF THE INVENTION

One of the problems that previously known power tools have is that they typically are dedicated to one type of fastener. Palm nailers, for example, can only install nails. The presently disclosed device has been developed to address this issue.

A battery-operated palm stapler, an insert for holding a fastener, and a method of installing a fastener using the palm stapler and insert is disclosed herein. The stapler includes a housing with a telescoping barrel extending outwardly therefrom. An insert is engaged in a bore of the barrel and may be held in position by magnets provided in a top wall of the insert. The insert body defines a slot therein that extends from the top wall of the body to a bottom wall thereof. At least one magnet is located in the body adjacent the slot and is used to hold a fastener in a correct orientation for installation. A sensor probe is provided in the body. The sensor probe is useful when the device is being used to secure electrical cables to a work surface. The probe detects whether or not there is voltage in the electrical cables. If voltage is detected, the probe will trigger deactivation of a hammer actuating mechanism and prevent the palm stapler from driving a fastener into the work surface. Inserts holding different types of fastener may be selectively engaged with the palm stapler.

In one aspect, the present disclosure may provide a palm stapler comprising a housing; a barrel extending outwardly from the housing; a hammer provided for reciprocal movement within a bore defined in the barrel; a hammer actuation mechanism for selective actuation of the hammer; a motor operatively engaged with the hammer actuation mechanism and operable to drive the hammer actuation mechanism; and a battery operatively engaged with the motor.

In one embodiment, the palm stapler may further comprise an insert that is adapted to retain a fastener therein. The insert may be selectively detachably engageable within the bore of the barrel. In one embodiment, the palm stapler may further comprise a retainer mechanism provided on one or both of the insert and the barrel, said retainer mechanism being operative to retain the insert within the bore of the barrel. In one embodiment, the insert may define a slot therein, wherein the slot is configured to be complementary to one or more of a plurality of different fasteners; and wherein the slot is furthermore positioned to receive a lower end of the hammer therethrough.

In one embodiment, the palm stapler may further comprise a holding mechanism that is provided in the insert, said holding mechanism being adapted to hold one of the one or more of the plurality of different fasteners in a position to be struck by the hammer.

In one embodiment, the palm stapler may further comprise a trigger mechanism operatively engaged with the motor and operable to cause the motor to deliver power to the hammer actuating mechanism. In one embodiment, the palm stapler may further comprise at least one sensor probe provided on one of the barrel and the insert, wherein the at least one sensor probe is adapted to detect a live wire in a work surface. In one embodiment, the palm stapler may further comprise a trigger mechanism operatively engaged with the motor and operable to cause the motor to deliver power to the hammer actuating mechanism, and wherein the at least one sensor probe is further operatively engaged with the trigger mechanism, and wherein the at least one sensor probe disengages the trigger mechanism when the live wire is detected in a work surface. In one embodiment, the palm stapler may further comprise an override button operably engaged with the trigger mechanism and wherein actuation of the override button re-engages the trigger mechanism.

In one embodiment, the palm stapler may include a first insert configured to selectively hold a first type of fastener therein; and a second insert configured to selectively hold a second type of fastener therein; wherein the first insert and the second insert are individually selectively engageable in the bore of the barrel.

In another aspect, the present disclosure may provide an insert for selective engagement with a palm stapler; said insert comprising a body having an exterior surface including a top wall, a bottom wall, and a side wall extending between the top wall and the bottom wall, wherein the exterior surface is adapted to be complementary to a portion of a bore of a palm stapler barrel; a slot defined in the body and extending from an opening defined in the top wall to an opening defined in the bottom wall; said slot being adapted to receive a fastener therein; and a holding mechanism provided on the body, said holding mechanism being adapted to hold the fastener in the slot in a position where the fastener is able to be struck by a hammer provided on the palm stapler.

In one embodiment, the insert may further comprise a retainer mechanism provided on the body, said retainer mechanism being adapted to hold the insert in the bore of the barrel. In one embodiment, the insert may further comprise a sensor probe provided on the body and adapted to detect voltage in a wire on a work surface. In one embodiment, the insert may further comprise a groove defined in the bottom wall of the body; said groove being in communication with the slot and being adapted to receive at least one electrical cable therein.

In another aspect, the present disclosure may provide a method of installing a fastener in a work surface comprising engaging a fastener in a slot defined in a body of an insert; installing the insert in a bore of a barrel extending outwardly from housing of a palm stapler; positioning a bottom end of the fastener and the insert body adjacent a work surface; activating a hammer actuating mechanism in the palm stapler; engaging a hammer in the palm stapler with the hammer actuating mechanism; and driving the fastener into the work surface.

In one embodiment the method may further comprise moving a portion of the hammer through the slot; contacting the fastener with the portion of the hammer; and driving the fastener out of the slot and into the work surface. In one embodiment the method may further comprise engaging a battery with the palm stapler; and powering the hammer actuating mechanism with the battery. In one embodiment the method may further comprise positioning one or more electrical cables on the work surface; positioning a portion of the body of the insert around the one or more electrical cables prior to actuating the hammer actuating mechanism. In one embodiment the method may further comprise detecting a voltage in the one or more electrical cables with a sensor probe provided in the body of the insert; and deactivating the hammer actuating mechanism if the voltage is detected. In one embodiment the method may further comprise contacting an override button when the voltage is detected by the sensor probe; and activating the hammer actuating mechanism as long as the override button is contacted.

BRIEF DESCRIPTION OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
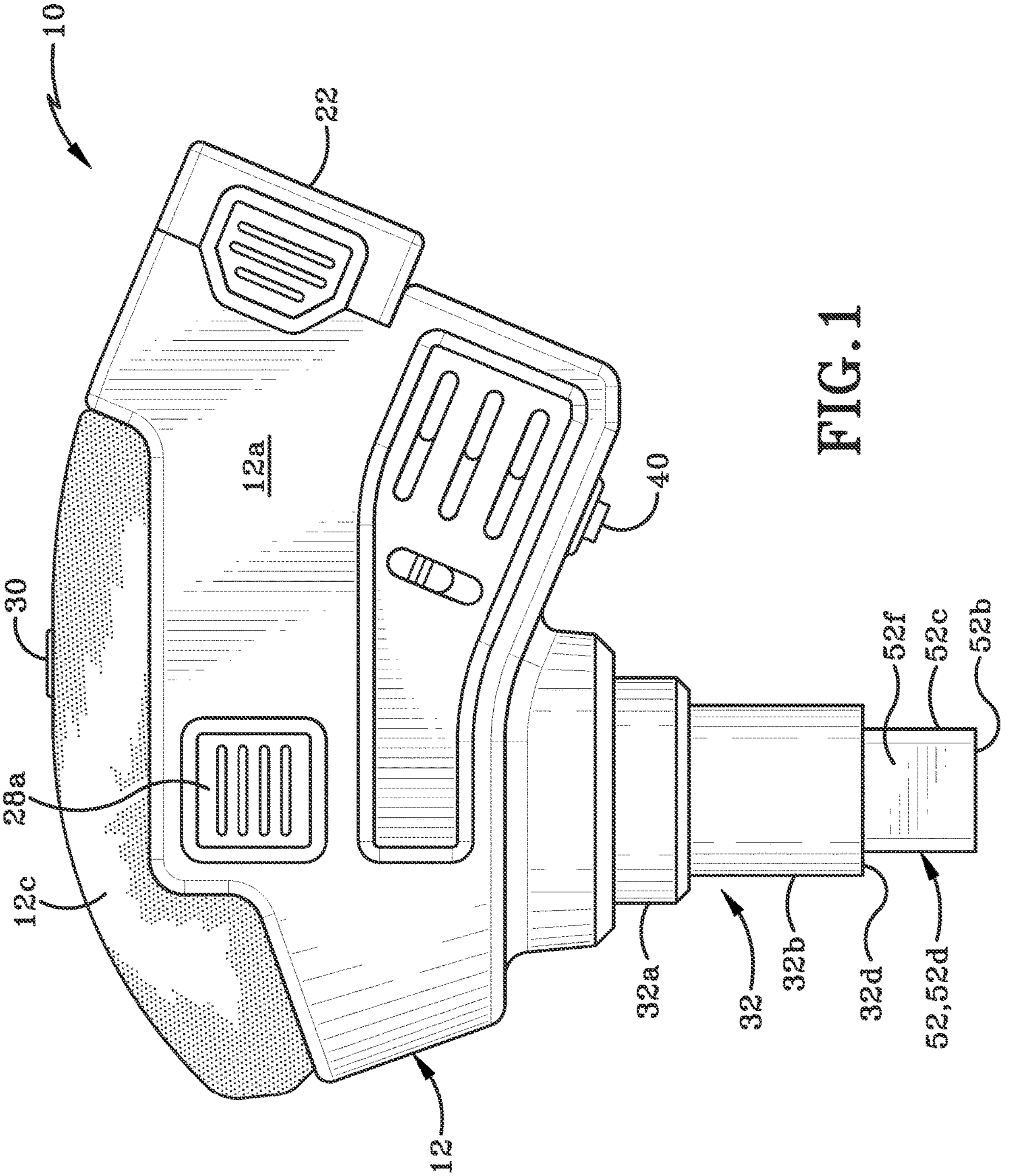
FIG. 1 is a side elevation view of a palm stapler in accordance with an aspect of the present disclosure.
Figure 2:
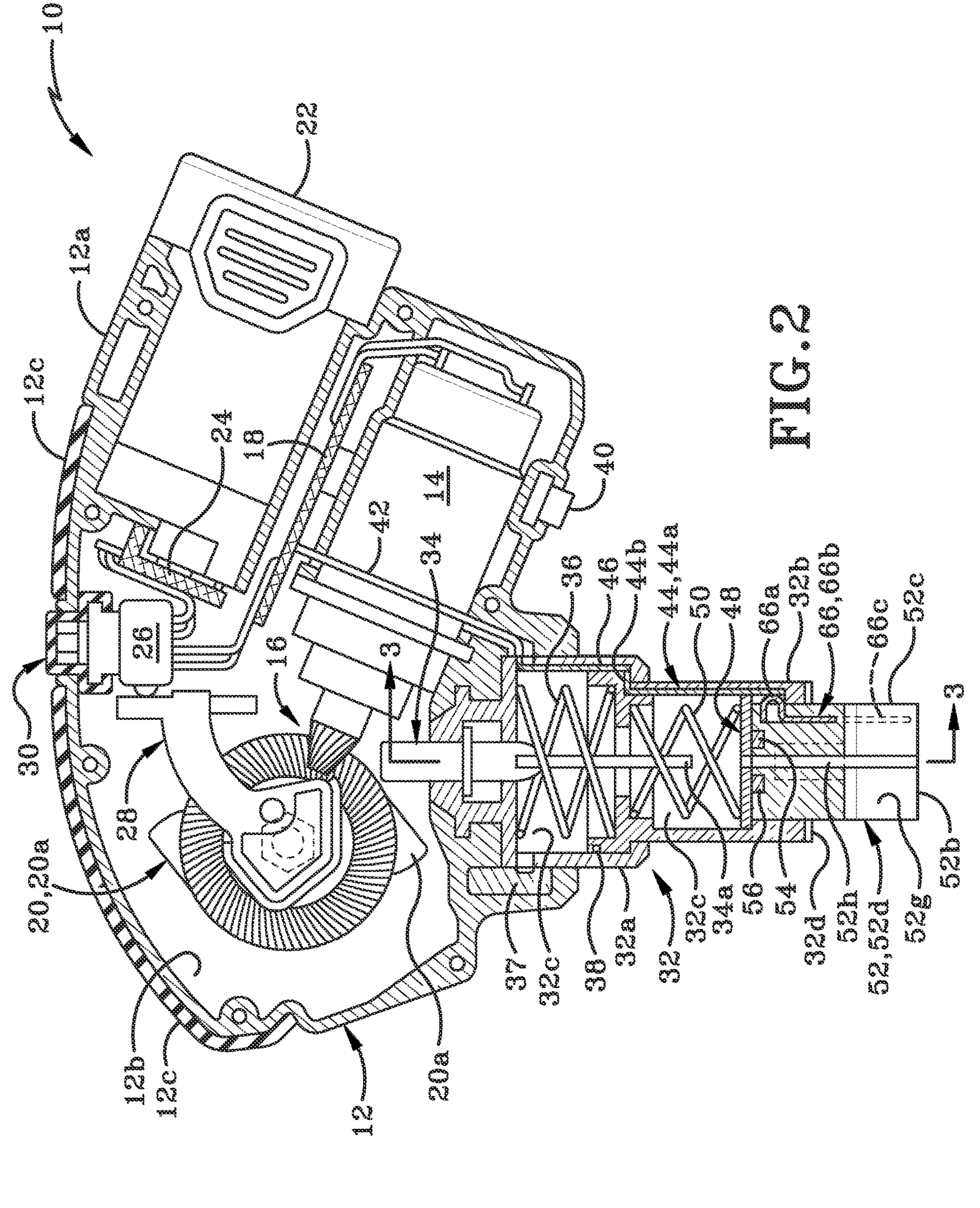
FIG. 2 is a longitudinal cross-section of the palm stapler of FIG. 1.

Referring to FIGS. 1 and 2, there is shown a palm stapler in accordance with an aspect of the present disclosure, generally indicated at 10. Palm stapler 10 includes a housing 12 having an exterior wall 12*a* that bounds and defines an interior cavity 12*b*. Housing 12 is ergonomically shaped so as to be easily and comfortably held in a user's hand. Textured gripping surfaces 12*c* may be provided on portions of the exterior wall 12*a* to help ensure that the user can readily grip housing 12.

It should be understood that the shape of housing 12 as illustrated in the attached figures is exemplary only. Any suitably shaped housing may be utilized instead of the housing 12 illustrated in the figures. It will further be understood that the specific placement of various elements of the palm stapler 10, particularly those present on the exterior wall 12*a*, may be other than is illustrated herein.

A variety of different components may be housed within interior cavity 12*b*. Some of these components are known and are not relevant to the present invention. As a consequence, such components may not have been illustrated in the attached figures or discussed any particular detail.

Various components provided in and on housing 12 are illustrated as being operatively engaged with each other in one exemplary manner. It will be understood that the components in and on housing 12 may be operatively engaged with each other in any other desired manner. At least some of the wiring connecting various components with each other may not have been shown in the figures. Components and wiring that have been omitted from the figures have been omitted for clarity of illustration only.

Interior cavity 12*b* of housing 12 houses a motor 14, a gear assembly 16, a first Printed Circuit Board (PCB) 18, and a hammer actuation mechanism 20. Palm stapler 10 is provided with a power source. As illustrated herein, the power source is a rechargeable battery 22 but it will be understood that other types of power source may be used instead of battery 22. For example, a power cord may be provided that is able to be plugged into a wall outlet and directly deliver power to motor 14. Battery 22 is detachably engaged with housing 12 and when so engaged, battery 22 is electronically connected to a second PCB 24. A switch 26 operatively engages second PCB 24 with a trigger mechanism 28. Trigger mechanism 28 has a trigger button 28*a* accessible on the exterior of housing 12. An override button 30 may be operatively engaged with one or both of first PCB 18 and second PCB 24. Override button 30 is also accessible on the exterior of housing 12.

Figure 3:
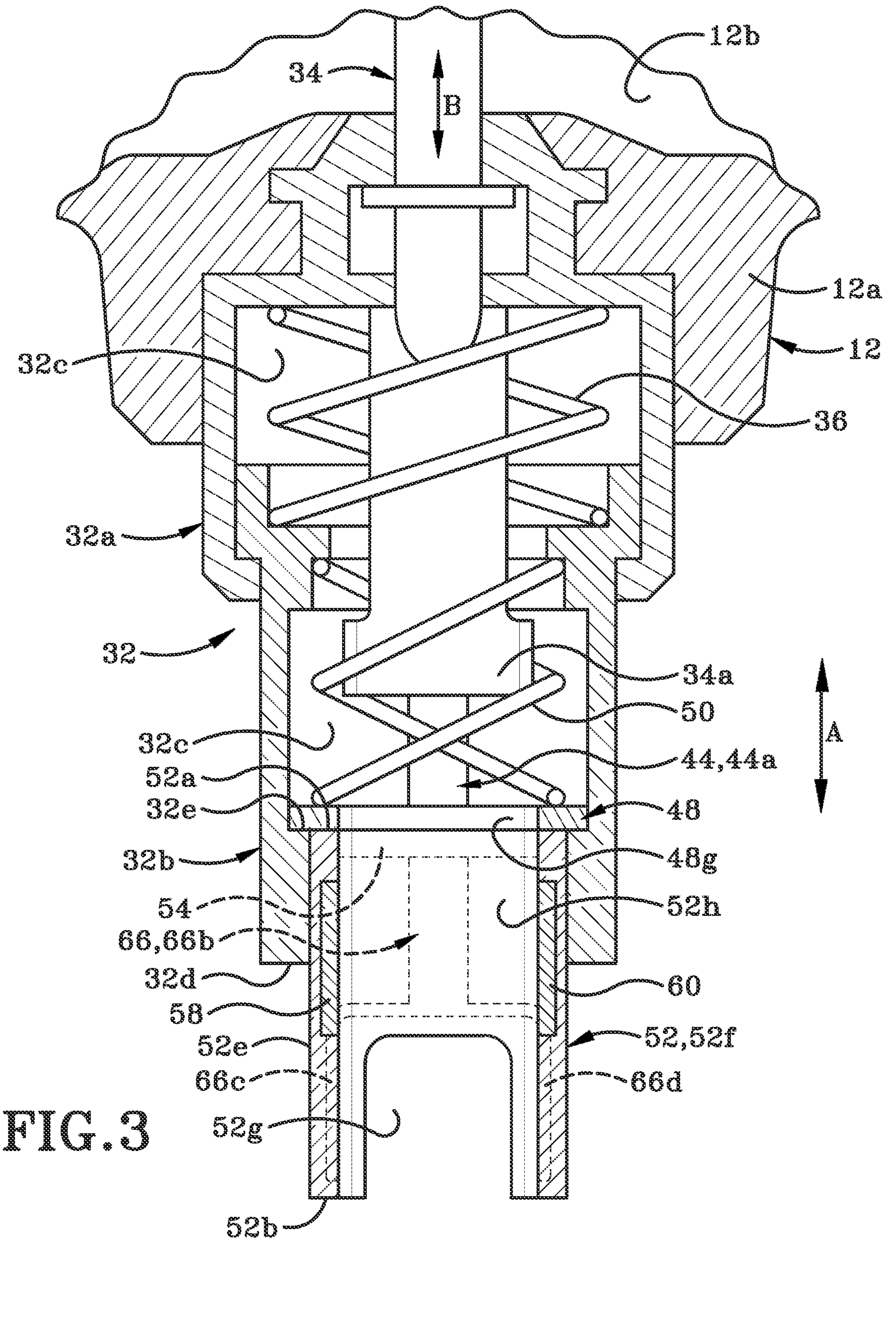
FIG. 3 is an enlarged view of the highlighted region of FIG. 2.

A barrel 32 extends outwardly and downwardly from a lower region of housing 12. Barrel 32 includes a first section 32*a* that is fixedly engaged with the housing 12 and a second section 32*b* that is configured to be telescopingly movable relative to first section 32*a*. Possible movement of second section 32*b* relative to first section 32*a* is indicated by arrow "A" in FIG. 3. A bore 32*c* is defined partially within first section 32*a* and partially within second section 32*b*. Bore 32*c* is at least partially in communication with interior cavity 12*b* of housing 12. Second section 32*b* of barrel 32 includes a lowermost end 32*d*. An annular interior ledge 32*e* (FIG. 3) is located a distance upwardly from lowermost end 32*d*.

A hammer 34 is located for reciprocal travel within bore 32*c* and a portion of interior cavity 12*b*. The reciprocal travel of hammer 34 is indicated by arrow "B" in FIG. 3. Hammer 34 is operatively engaged with hammer actuation mechanism 20. Hammer actuation mechanism 20 is driven by motor 14 and causes hammer 34 to travel within bore 32*c*. A spring 36 is provided within the portion of bore 32*c* that is defined in first section 32*a* of barrel 32. One end of spring 36 is seated within a recess defined in an upper portion of the bore's second section 32*b*. Spring 36 urges second section 32*b* of barrel 32 downwardly and outwardly away from first section 32*a* thereof. If a lowermost end 32*d* of second section 32*b* is placed on a work surface and downward pressure (i.e., pressure in a direction toward the work surface) is applied to housing 12, second section 32*b* will telescope inwardly relative to first section 32*a*. This inward telescoping reduces the overall length of barrel 32 and compresses spring 36 as second section 32*b* of barrel 32 moves upwardly towards housing 12.

When trigger mechanism 28 is engaged by depressing trigger button 28*a* on the housing's exterior surface, hammer actuation mechanism 20 is activated and will repeatedly impact hammer 34. As a consequence, hammer 34 will repeatedly deliver blows downwardly in a direction towards the work surface until the full throw of the hammer 34 is reached or until the button 28*a* is released. The full throw of the hammer 34 is reached when second section 32*b* of barrel 32 is depressed to the greatest extent inwardly towards first section 32*a*. A hall effect/magnetic sensor 37 is provided in housing 12 proximate an upper region of first section 32*a* of barrel 32. A cooperating sensor 38 is provided on an upper end of second section 32*b* of barrel 32. Sensor 38 aligns with sensor 37 when hammer 34 reaches its full throw. When sensor 38 comes into alignment with sensor 37, hammer actuation mechanism 20 is deactivated and hammer 34 will no longer reciprocate within bore 32*c*. Sensors 37, 38 are therefore operative to limit the motion of hammer 34 at full throw.

Palm stapler 10 also includes one or more Light Emitting Diodes (LEDs) 40 that are provided on housing 12. LEDs 40 are located so that light emitted therefrom to be directed toward the work surface into which a fastener is to be installed. LEDs 40 may be actuated prior to engaging trigger mechanism 28 so that an operator is readily able see the location on the work surface into which the fastener is to be installed.

Referring still to FIG. 2 and in accordance with an aspect of the present disclosure, barrel 32 may be provided with an electrical contact that is operatively engaged with first PCB 18 via wiring 42. In the illustrated embodiment, the electrical contact comprises a first metal strip 44 which extends from proximate a bottom interior surface of second region 32*b* of barrel 32 to proximate a top interior surface thereof. First metal strip 44 has a first leg 44*a* and a second leg 44*b* oriented at an angle to first leg 44*a*. First metal strip 44 is generally L-shaped when viewed in cross-section as in FIG. 2. The electrical contact further comprises a second metal strip 46 which originates proximate a lowermost interior surface of first section 32*a* of barrel 32 and extends upwardly toward an uppermost interior surface of first section 32*a*. Wiring 42 is electrically connected to second metal strip 46. First metal strip 44 and second metal strip 46 remain in constant contact with each other because second leg 44*b* of first metal strip 44 continuously touches second metal strip 46. This contact between first metal strip 44 and second metal strip 46 is maintained while second section 32*b* of barrel 32 telescopes relative to first section 32*a* thereof. (It will be understood that in other examples, the second metal strip may be substantially L-shaped instead of the first metal strip such that a leg of the second metal strip extends outwardly and remains in constant contact with the first metal strip.) It will be further understood that any other configuration of electrical contact may be provided on housing 12.

In accordance with an aspect of the present disclosure, a plate 48 is seated within a portion of bore 32*c* defined by second section 32*b* of barrel 32. In particular, plate 48 is seated on annular ledge 32*e*. A second spring 50 is placed between plate 48 and a second recessed region defined toward an upper end of second section 32*b* of barrel 32. Second spring 50 urges plate 48 downwardly away from first section 32*a* of barrel 32.

Figure 4:
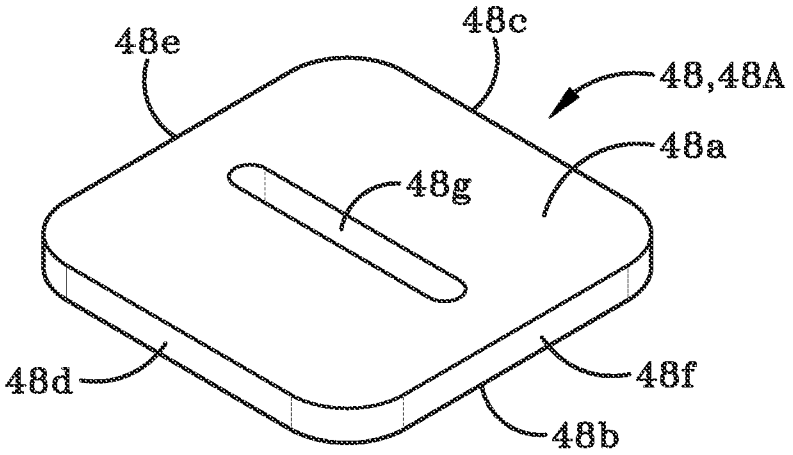
FIG. 4 is a front, top, right side, isometric view of a first embodiment of a plate in accordance with the present disclosure.
Figure 5:
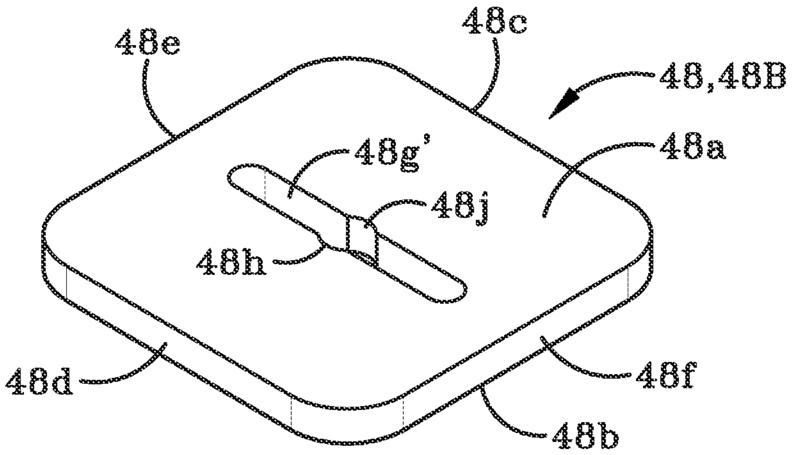
FIG. 5 is a front, top, right side, isometric view of a second embodiment of a plate in accordance with the present disclosure.
Figure 6:
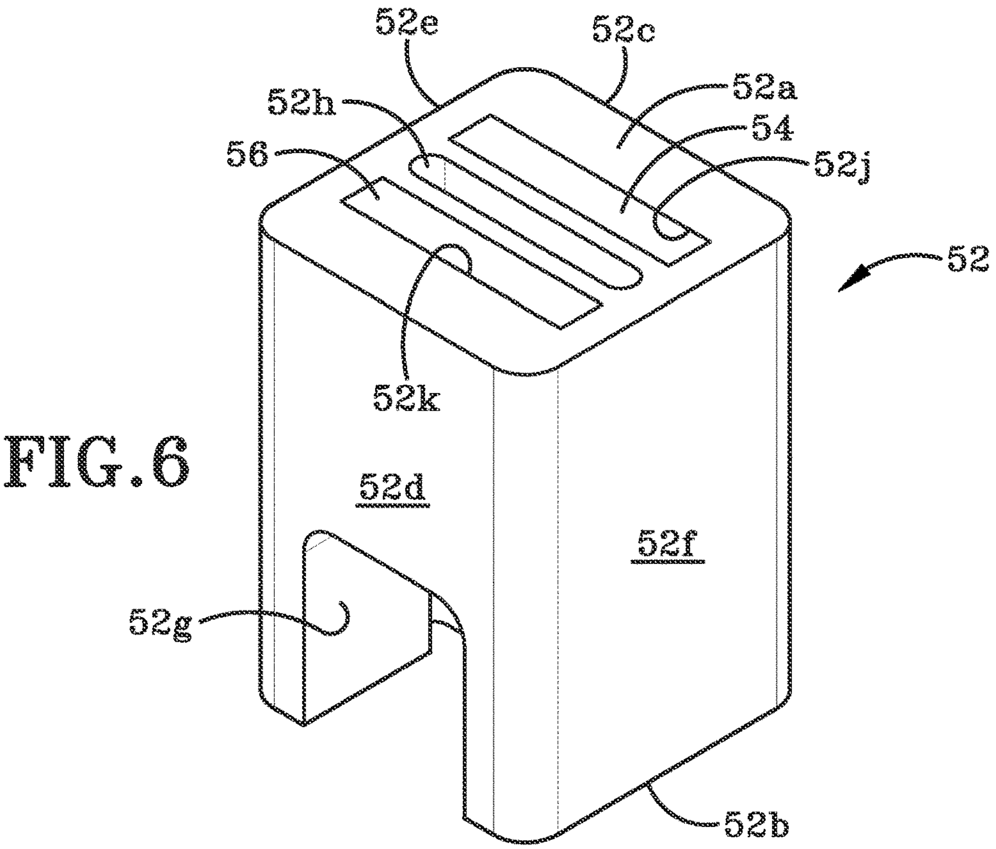
FIG. 6 is a front, top, right side isometric view of a first embodiment of an insert in accordance with the present disclosure.

FIGS. 4 and 5 show two different plates 48 that may be utilized in palm stapler 10. A first exemplary plate is identified by the reference number 48A and is illustrated in FIG. 4. A second exemplary plate is identified by the reference number 48B and is illustrated in FIG. 5.

Referring to FIG. 4, plate 48A has a top wall 48*a*, a bottom wall 48*b*, a first end 48*c*, a second end 48*d*, a first side 48*e*, and a second side 48*f*. Plate 48A is illustrated as being generally square in shape when viewed from above. The corners of this generally square plate 48A are rounded. This shape of plate 48A is utilized when the bore 32*c* of barrel 32 is generally square in cross-section. If bore 32*c* is of a different cross-sectional shape, then plate 48A will be configured to be substantially complementary thereto. So, for example, if bore 32*c* is generally rectangular in cross-sectional shape then plate 48A will similarly be generally rectangular in shape. If bore 32*c* is generally circular in cross-sectional shape, then plate 48A will similarly be generally circular in shape. Plate 48A is also configured to be slightly smaller than the cross-sectional dimensions of bore 32*c* so that plate 48A is receivable within the bore 32*c*.

Plate 48A defines a slot 48*g* therein that extends from top wall 48*a* through to bottom wall 48*b*. Slot 48*g* is complementary shaped and sized to receive a lower portion of hammer 34, including tip 34*a*, therethrough. In other words, slot 48*g* is shaped to be complementary to the cross-sectional shape of the lower portion of hammer 34 and is sized so as to receive that lower portion of hammer 34 therethrough. Plate 48A is illustrated as having a generally rectangular slot 48*g* defined therein. This generally rectangular slot 48*g* has rounded end regions.

Plate 48B shown in FIG. 5 is substantially identical in configuration to plate 48A and includes a top wall 48*a*, a bottom wall 48*b*, a first end 48*c*, a second end 48*d*, a first side 48*e*, and a second side 48*f*. Plate 48B is illustrated as being generally square in shape with gently rounded corners, when viewed from above. This shape of plate 48B is utilized when the bore 32*c* of barrel 32 is generally square in cross-section. If bore 32*c* is of a different cross-sectional shape, then plate 48B will be configured to be substantially complementary thereto. So, for example, if bore 32*c* is generally rectangular in cross-sectional shape then plate 48B will similarly be generally rectangular in shape. If bore 32*c* is generally circular in cross-sectional shape, then plate 48B will similarly be generally circular in shape. Plate 48B is also configured to be slightly smaller than the cross-sectional dimensions of bore 32*c* so that plate 48B is receivable within the bore 32*c*.

Plate 48B defines a slot 48*g*' therein. The configuration of slot 48*g*' is different to the slot 48*g* defined in plate 48A. Slot 48*g*' includes the slot 48*g* but further includes two opposed generally semi-circular regions 48*h*, 48*j* that are in communication with the rest of the slot. The two semi-circular regions 48*h*, 48*j* are located substantially midway along the length of slot 48*g*'. When viewed from above, the regions 48*h*, 48*j* together with a portion of the slot 48*g*' that is located between regions 48*h*, 48*j* takes on the appearance of a circle.

FIGS. 1 and 2 show one of the plates 48A, 48B engaged in the bore 32*c* of barrel 32. That plate is indicated by the reference number 48 to identify that either of the plates 48A, 48B may be utilized therein. It will be understood that the shapes of slots 48*g*, 48*g*' may be any shape that is complementary to a lower portion of the hammer 34. It will be understood that the hammer 34 as illustrated herein is simply an example of one type of hammer that may be utilized in palm stapler 10. It should be understood that any other suitable type of hammer may be utilized in palm stapler 10 and then the slots 48*g*, 48*g*' in plates 48A, 48B will be configured complementary thereto. When plate 48 is inserted into bore 32*c*, plate 48 is positioned so that the lower portion of hammer 34, including tip 34*a* will pass through slot 48*g*, 48*g*'. In accordance with an aspect of the present disclosure, plate 48 is fabricated from a magnetic material or from a paramagnetic material.

In accordance with another aspect of the present disclosure, an insert may selectively be inserted into an opening defined by lowermost end 32*d* of barrel 32. The insert is configured to receive one or more different types of fastener therein and will hold the received fastener in a suitable position to be struck by hammer 34.

FIGS. 1-3 and 6-13 show a first embodiment of an insert in accordance with the disclosure, generally indicated at 52. Insert 52 is illustrated as being a rectangular cube in shape. This configuration is selected as it is complementary to the cross-sectional shape of the lower portion of the bore 32*c* of second section 32*b* of barrel 32. In particular, the insert 52 is generally square in cross-sectional shape as this a shape complementary to the cross-sectional shape of bore 32*c*. It will be understood, however, that whatever the cross-sectional shape of bore 32*c*, insert 52 will be fabricated to be of a complementary cross-sectional shape.

Insert 52 has a top wall 52*a*, a bottom wall 52*b*, a first end 52*c*, a second end 52*d*, a first side 52*e*, and a second side 52*f*. Top wall 52*a* and bottom wall 52*b* are substantially parallel to each other and a vertical direction is defined between them. First end 52*c* and second end 52*d* are substantially parallel to each other and a longitudinal direction is defined between them. First side 52*e* and second side 52*f* are substantially parallel to each other and a lateral direction is defined between them.

A groove 52*g* is defined in a lower region of insert 52. Groove 52*g* extends from first end 52*c* through to second end 52*d* and is accessible through an opening defined in bottom wall 52*b*. Groove 52*g* therefore extends longitudinally through insert. FIG. 11 shows that groove 52*g* is generally U-shaped when viewed from either of the first end 52*c* or the second end 52*d*.

Insert 52 further defines a slot 52*h* therein. Slot 52*h* is generally vertically oriented and extends from top wall 52*a* through to groove 52*g*. Slot 52*h* extends laterally from a short distance inwardly from first side 52*e* to a short distance inwardly from second side 52*f*. Slot 52*h* may be located generally midway between first end 52*c* and second end 52*d*. Slot 52*h* is oriented parallel to first end 52*c* and second end 52*d* and is positioned such that when plate 48 is positioned adjacent top wall 52*a*, slot 48*g* in plate 48 and slot 52*h* in insert 52 are substantially aligned with each other. In particular, when plate 48 is located adjacent top wall 52*a*, first end 48*c* of plate 48 is aligned with first end 52*c* of insert 52; second end 48*d* of plate 48 is aligned with second end 52*d* of insert 52; first side 48*e* of plate 48 is aligned with first side 52*e* of insert 52, and second side 48*f* of plate 48 is aligned with second side 52*f* of insert 52. Slot 48*g* in plate 48 and slot 52*h* in insert 52 may be of substantially the same length and substantially the same width. When insert 52 is engaged in bore 32*c* of barrel 32, as will be described later herein, the aligned slots 48*g*, 52*h* permit a lower end 34*a* of hammer 34 to pass therethrough and into groove 52*g*.

A retainer mechanism is provided to retain insert 52 within the bore 32*c* of barrel 32. The retainer mechanism may take any one of a number of forms but as illustrated in the attached figures, in the present disclosure, the retainer mechanism utilizes magnetic attraction to hold insert 52 within bore 32*c*. The retainer mechanism comprises at least one magnet provided on the barrel and at least one magnet provided on the insert 52. The magnets may be located at any suitable locations on barrel 32 and insert 52. In palm stapler 10, magnets are provided on the plate 48 of barrel 32 and on the top wall 52*a* of insert 52. This will be described in greater detail below.

Figure 10:
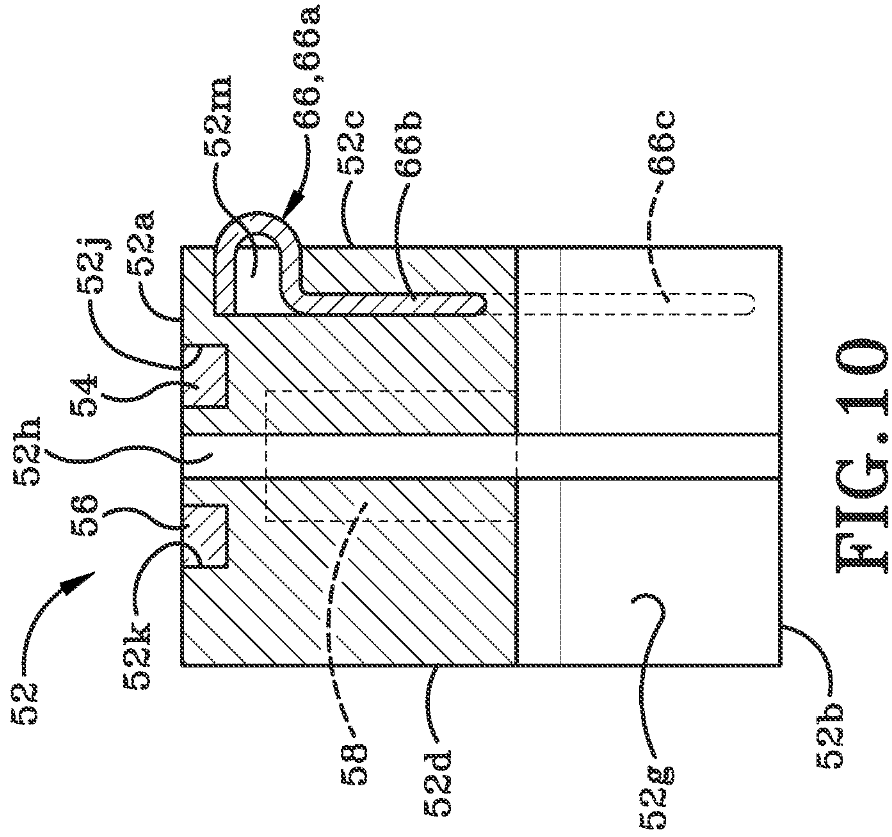
FIG. 10 is a longitudinal cross-section of the insert taken along line 10-10 of FIG. 8.

As best seen in FIG. 10, top wall 52*a* of insert 52 defines a first depression 52*j* and a second depression 52*k* therein. First depression 52*j* is oriented substantially parallel to slot 52*h* and is located between first end 52*c* and slot 52*h*. Second depression 52*k* is oriented substantially parallel to slot 52*h* and is located between second end 52*d* and slot 52*h*.

It will be understood that in other examples, first and second depressions 52*j*, 52*k* may be shaped and located differently from what is illustrated in the attached figures. Additionally, only one depression or more than two depressions may be defined in top wall 52*a*. 52*a* of insert 52.

Insert 52 further includes at least one magnet in one of the first and second depressions 52*j*, 52*k*. Preferably, a first magnet 54 is engaged in first depression 52*j* and a second magnet 56 is engaged second depression 52*k*. First magnet 54 and second magnet 56 are consequently positioned on opposite sides of slot 52*h*. First magnet 54 and second magnet 56 are oriented substantially parallel to slot 52*h*.

If depressions 52*j*, 52*k* are differently shaped or are located in other positions on top wall 52*a*, or if there is only one depression or more than two depressions, a magnet complementary to the provided depression(s) will be provided.

The poles of first and second magnets 54, 56 are oriented such that when insert 52 is received within bore 32*c* of barrel 32, first and second magnets 54, 56 are magnetically attracted to plate 48. The magnetic attraction between first and second magnets 54, 56 and plate 48 is sufficiently strong enough to keep insert 52 engaged with plate 48 and therefore retained within bore 32*c*. Insert 52 is retained magnetically engaged with plate 48 and within bore 32*c* until an operator pulls insert 52 downwardly in a direction to move the insert 52 out of bore 32*c* and thereby breaks the magnetic attraction between insert 52 and plate 48.

Figure 8:
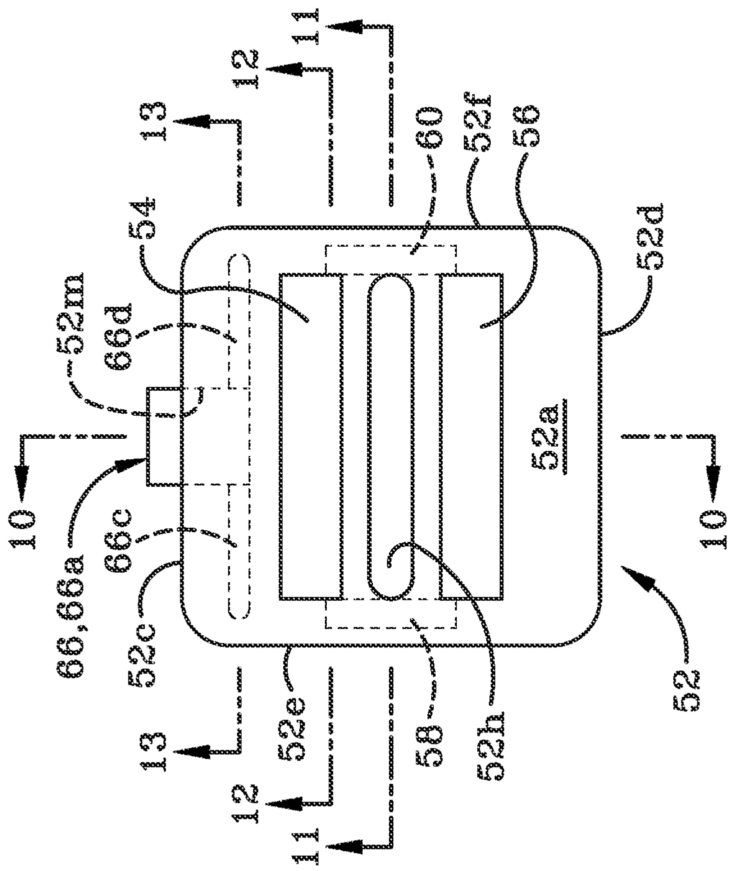
FIG. 8 is a top plan view of the insert.
Figure 11A:
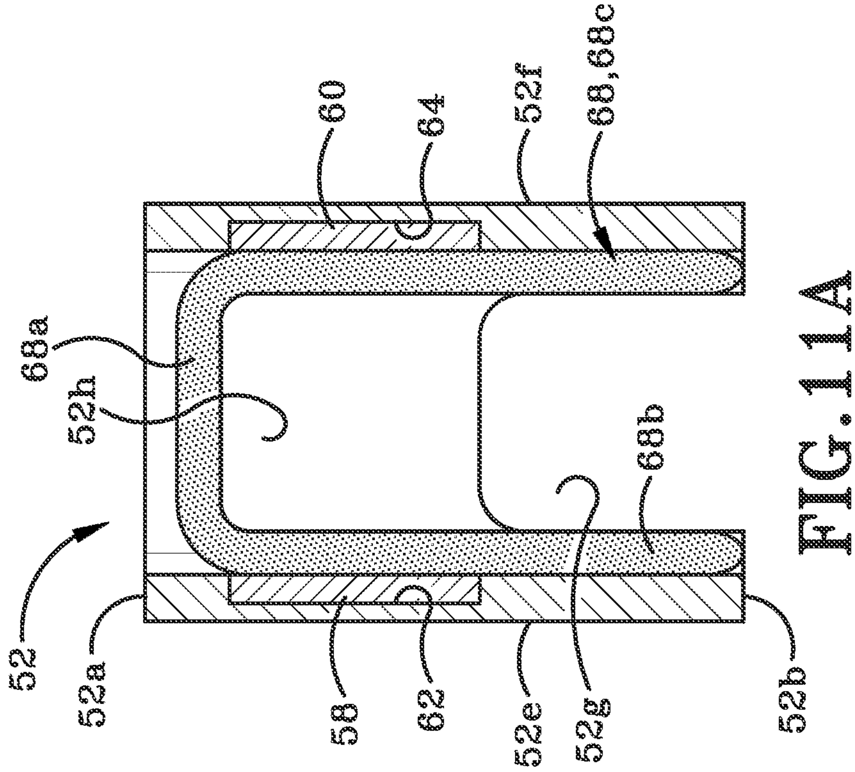
FIG. 11*a* is a transverse cross-section of the insert taken along line 11-11 of FIG. 8 showing a staple engaged therewith.
Figure 11:
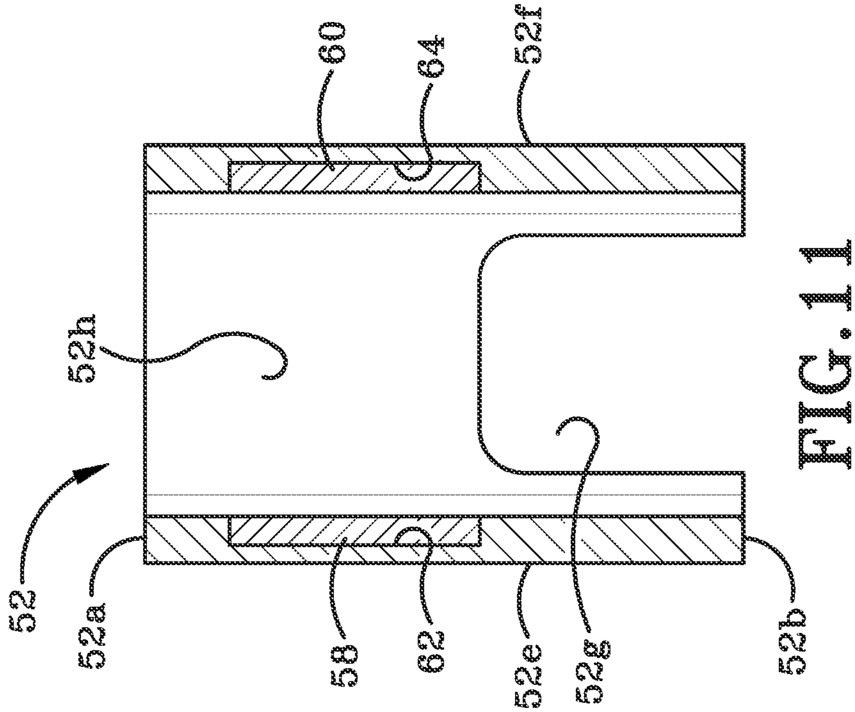
FIG. 11 is a transverse cross-section of the insert taken along line 11-11 of FIG. 8.

As best seen in FIGS. 8, 11 and 11A, insert 52 is provided with a holding mechanism that holds a fastener in the correct position and correct orientation so that the fastener is able to be struck by hammer 34 and driven into a work surface 70 as will be described later herein. In particular, the holding mechanism utilized on any of the inserts disclosed herein is utilized to hold at least one particular type of a plurality of different fasteners in a position that will enable the hammer 34 to drive that fastener straight down into the work piece 70. In other words, the holding mechanism helps to ensure that the hammer 34 does not drive the fastener crookedly into the work piece.

As illustrated, the holding mechanism provided in insert 52 a third magnet 58 and a fourth magnet 60 that are positioned on either end of slot 52*h* and are located in recesses 62, 64, respectively. Third and fourth magnets 58, 60 are therefore located a distance downwardly from top wall 52*a*. Third magnet 58 is located between a first end of slot 52*h* and first side 52*e* of insert 52. Fourth magnet 60 is located between a second end of slot 52*h* and second side 52*f* of insert 52. Third and fourth magnets 58, 60 are provided to magnetically hold a fastener in a correct position and orientation within slot 52*h*, as will be later described herein. It will be understood that other types of holding and orienting mechanisms may be utilized on insert 52.

Figure 7:
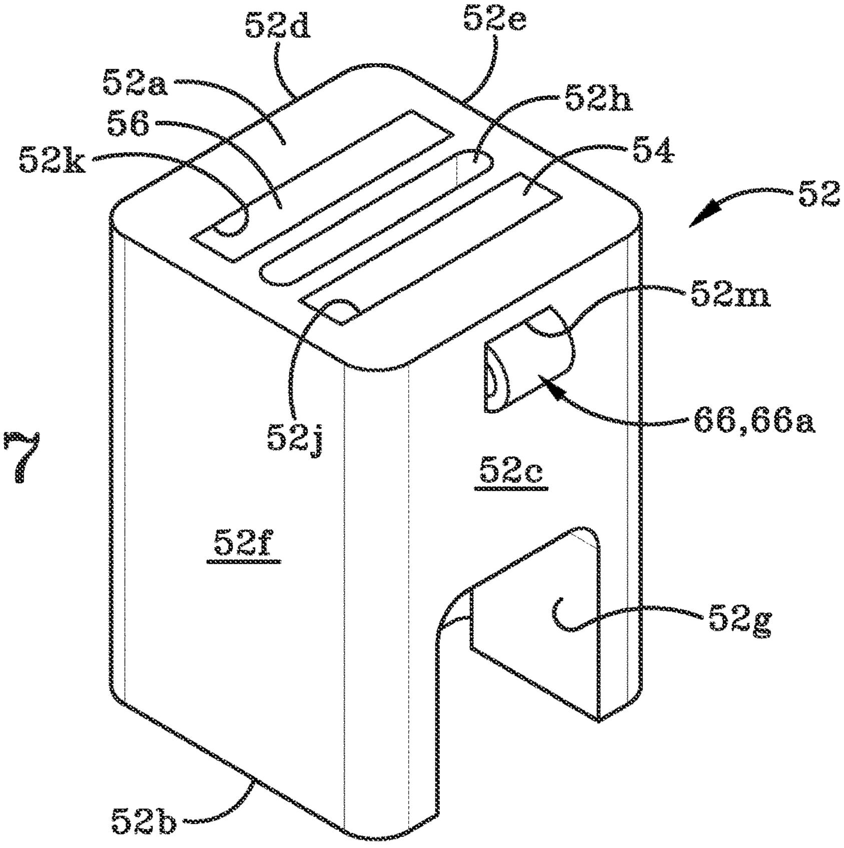
FIG. 7 is a back, top, right side isometric view of the insert of FIG. 6.
Figure 13:
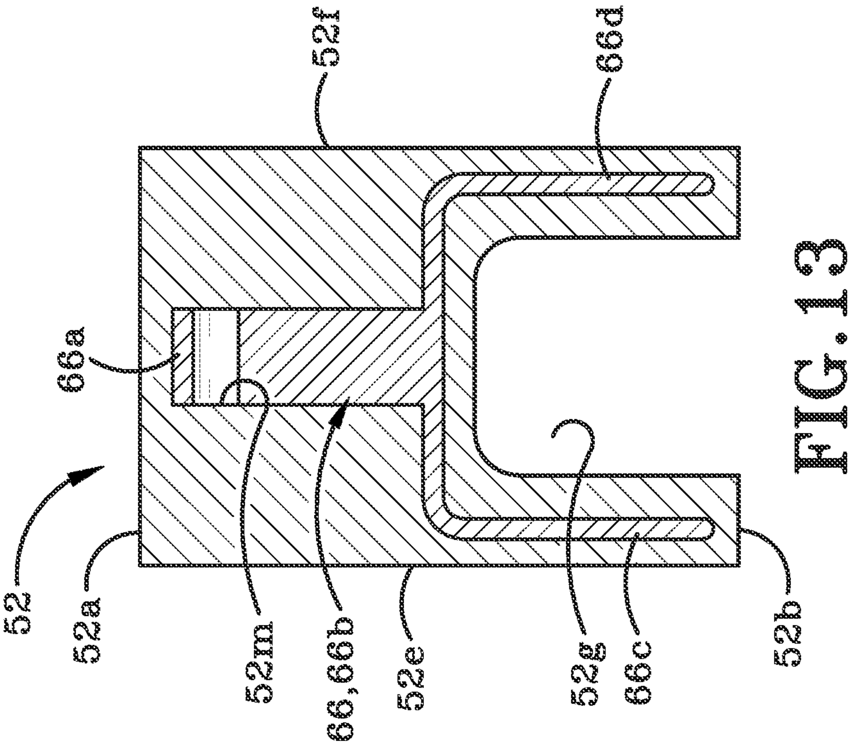
FIG. 13 is a transverse cross-section of the insert taken along line 13-13 of FIG. 8.
Figure 12:
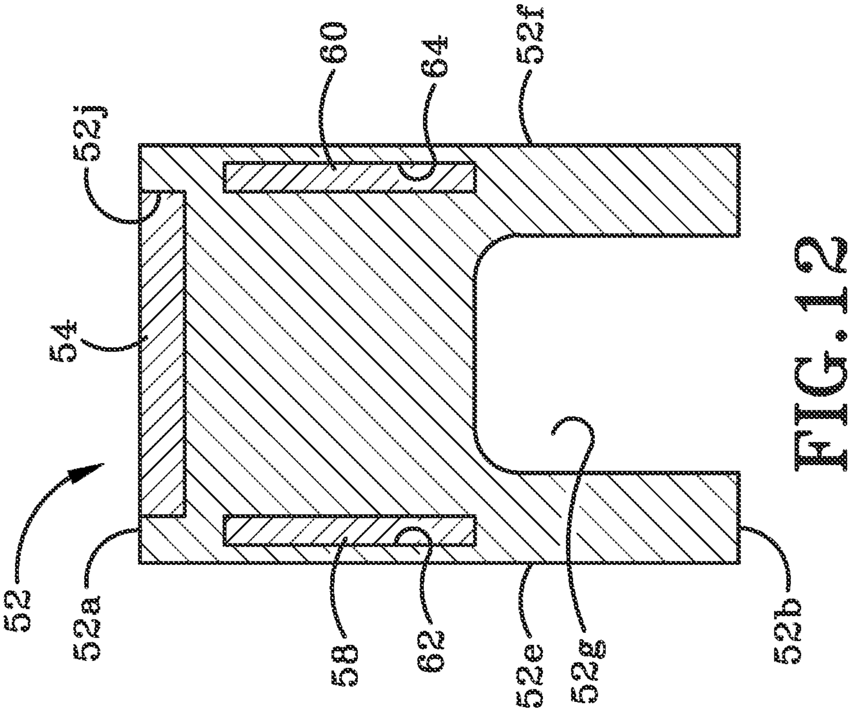
FIG. 12 is a transverse cross-section of the insert taken along line 12-12 of FIG. 8.
Figure 14:
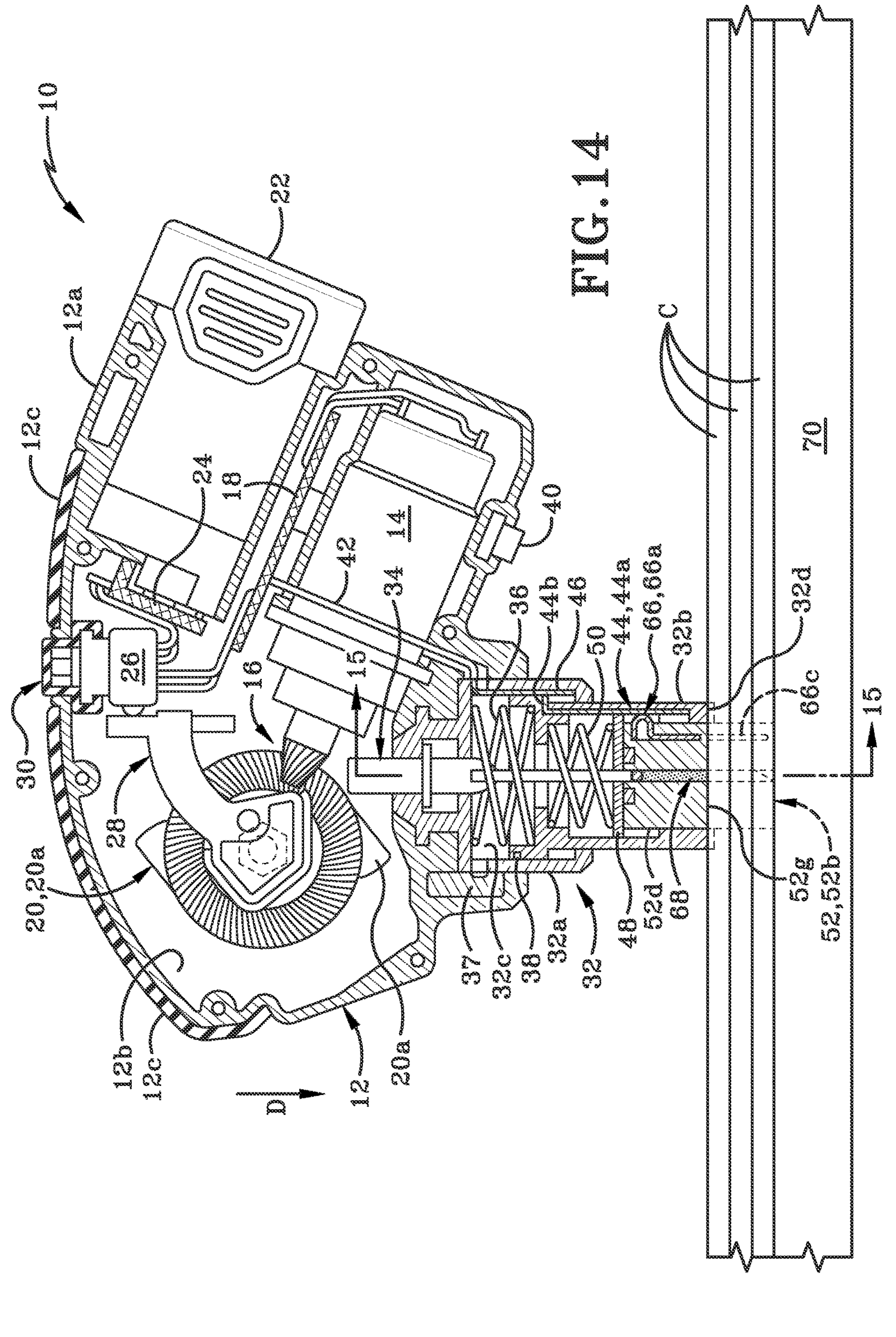
FIG. 14 is a longitudinal cross-section of the palm stapler with the insert engaged therewith, and showing the hammer of the palm stapler positioned to drive a fastener downwardly into a work surface in order to secure three electrical cables to the work surface.
Figure 15:
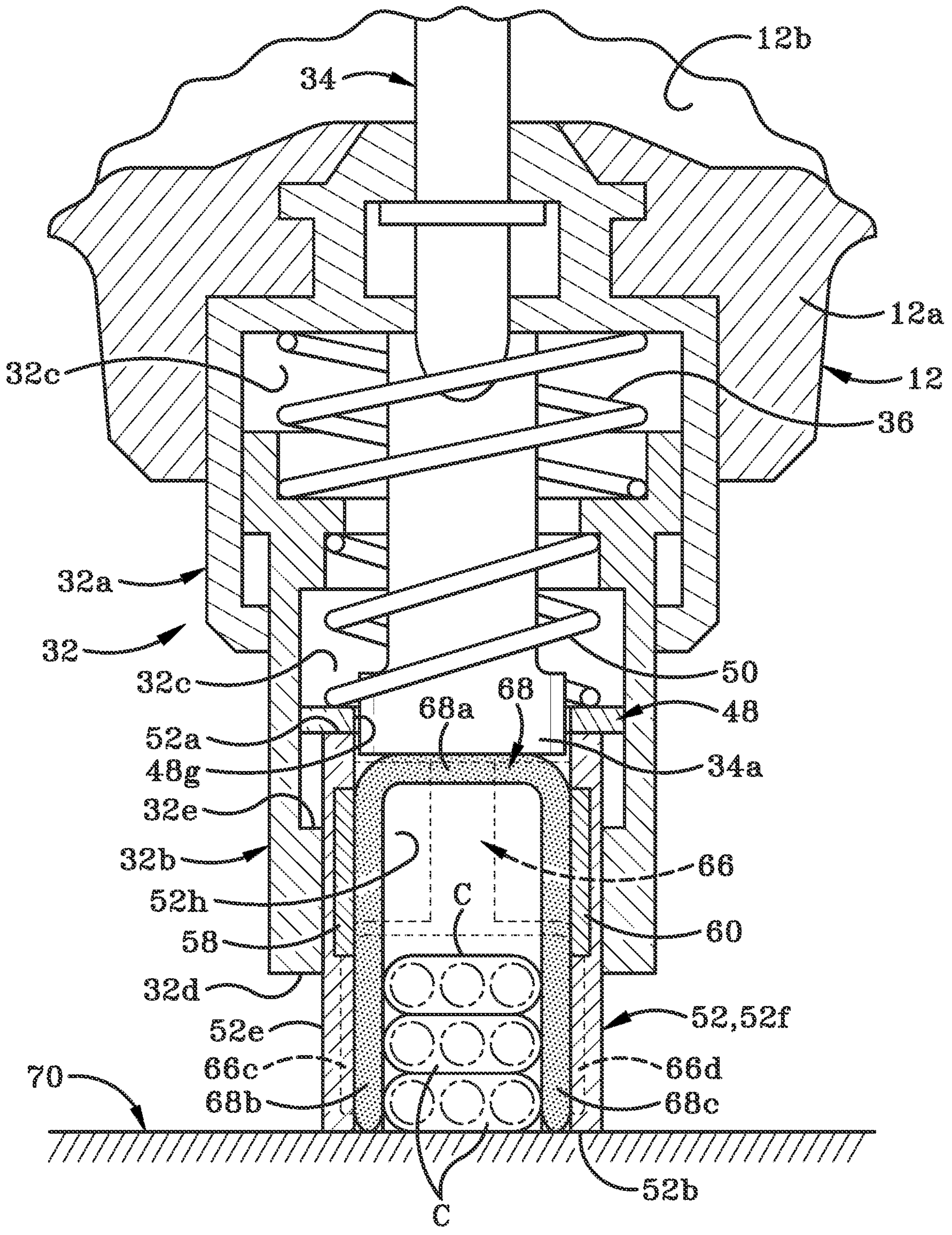
FIG. 15 is an enlarged front view of the palm stapler and insert taken along line 15-15 of FIG. 14.
Figure 16:
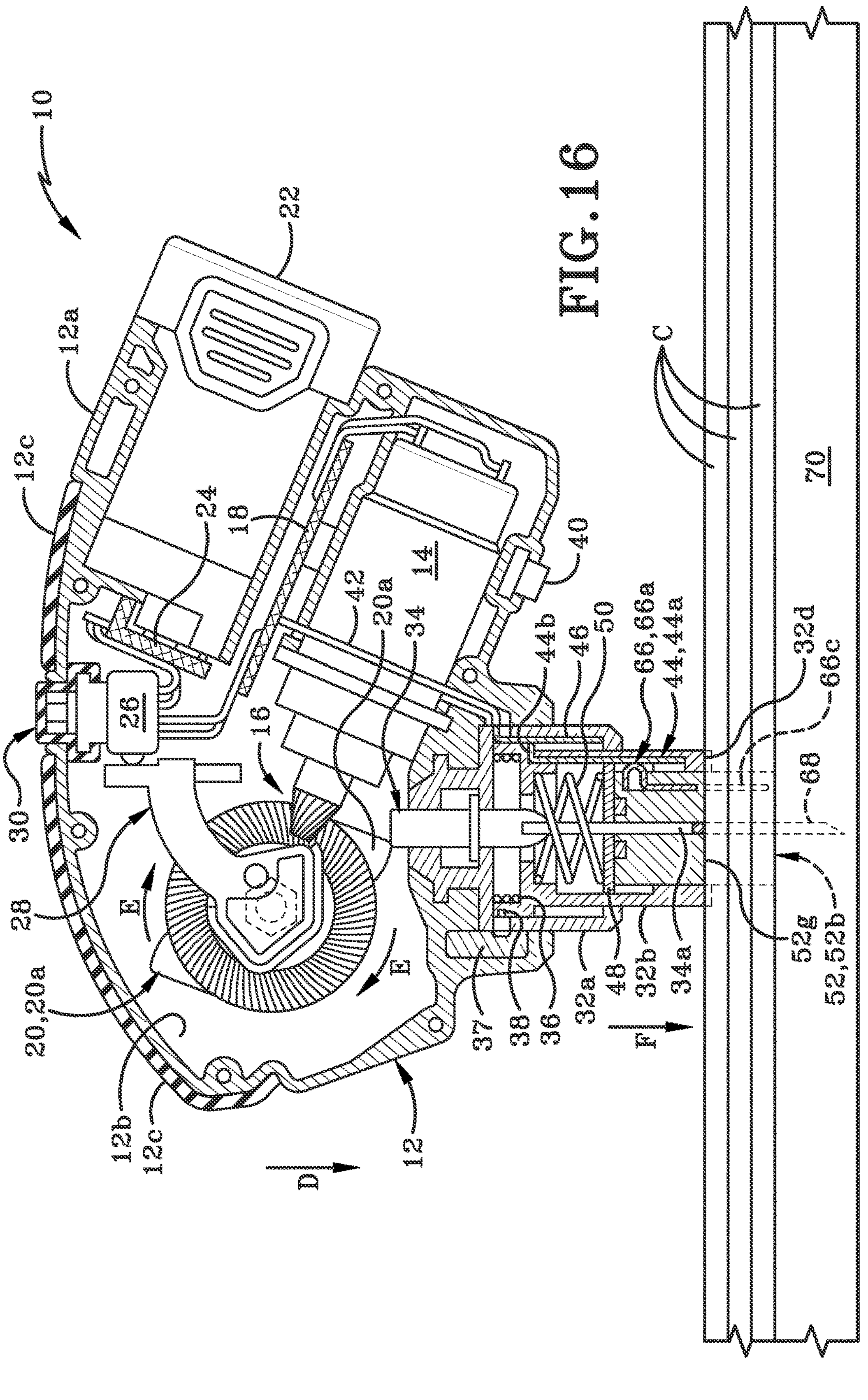
FIG. 16 is a longitudinal cross-section of the palm stapler with the insert engaged therewith, and showing the hammer moving downwardly and driving the fastener into the work surface.
Figure 18:
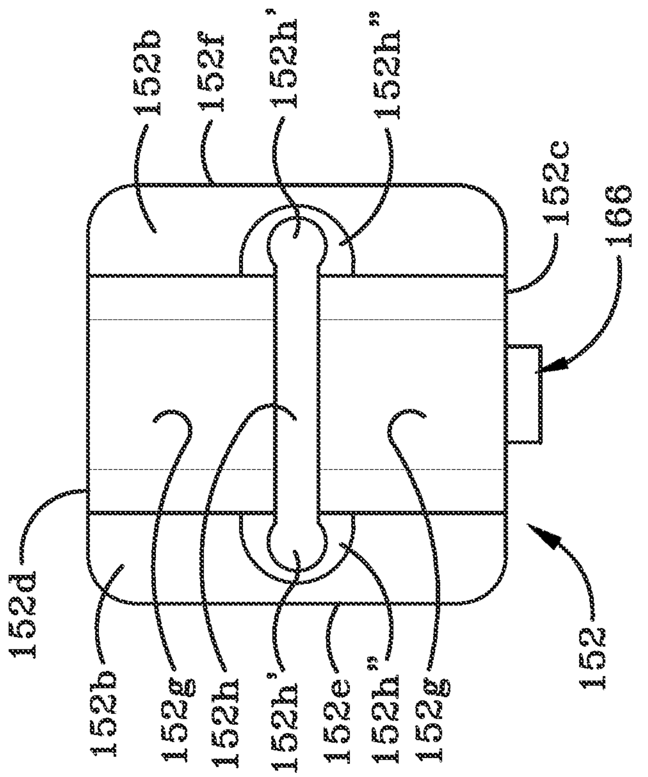
FIG. 18 is a bottom plan view of the insert of FIG. 17.

Insert 52 further defines an aperture 52*m* in first end 52*c*. Aperture 52*m* is located a distance downwardly from top wall 52*a* and may be positioned approximately midway between first side 52*e* and second side 52*f*. As best seen in FIGS. 7, 10, and 13, a sensor probe 66 is provided in insert 52. Sensor probe 66 includes a first region 66*a* that extends through aperture 52*m* and a second region 66*b* that extends downwardly from first region 66*a* to a location a short distance above groove 52*g*. An L-shaped third region 66*c* and an L-shaped fourth region 66*d* extend in opposite directions from a bottom end of second region 66*b*. Third region 66*c* extends around a first part of groove 52*g* and fourth region 66*d* extends around a second part of groove 52*g*.

FIG. 13 shows that sensor probe 66 is generally of an inverted Y-shape and a portion of this Y-shape brackets the groove 52*g*. The first region 66*a* of sensor probe 66 extends outwardly from aperture 52*m* to a sufficient degree that it will contact first metal strip 44 on barrel 32 when insert 52 is received in bore 32*c*. The U-shape of first region 66*a* ensures that contact between first region 66*a* and first metal strip 44 will be maintained as second region 32*b* of barrel 32 telescopes relative to the first region 32*a* of barrel 32. This contact between first metal strip 44 and sensor probe 66 electrically connects sensor probe 66 to first PCB 18.

When an operator wishes to use palm stapler 10 to install a fastener into a work surface, he or she will first select the type of fastener that is to be used. For example, the operator may wish to install a staple 68 (FIGS. 11A and 14-16) around one or more electrical cables "C". The operator will then select an appropriate insert from a group of different inserts to receive staples. In order to install staples 68, the operator will select insert 52. Gripping a lower region of insert 52 between the operator's index finger and thumb, the operator will introduce an upper region of insert 52 into the opening defined by the lower end 32*d* of barrel 32. Insert 52 will be pushed upwardly until first and second magnets 54, 56 magnetically engage with plate 48.

Figure 9:
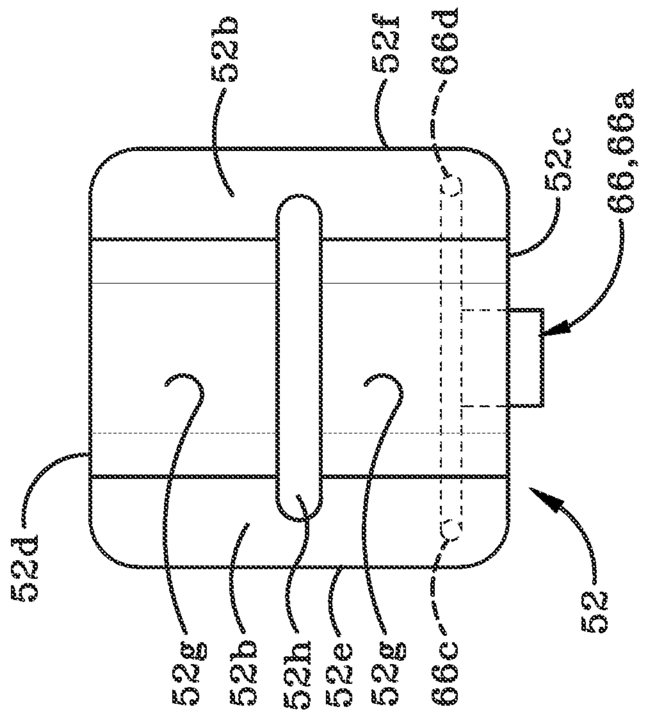
FIG. 9 is a bottom plan view of the insert.

The operator will then select a staple 68 and will insert an upper end 68*a* of staple through the opening to slot 52*h* defined in bottom wall 52*b*, i.e., through the opening that may be seen in FIG. 9. Staple 68 is pushed upwardly into slot 52*h* to a sufficient degree that third and fourth magnets 58, 60 will magnetically hold staple 68 in place. At this point, at least a portion of the legs 68*b*, 68*c* of staple 68 may extend outwardly beyond bottom wall 52*b* of insert 52.

The electrical cables "C" (FIGS. 14 and 15) are then placed one above the other on a work surface 70. Palm stapler 10 will be positioned so that the groove 52*g* of insert 52 receives the three stacked cables "C" therein and so that bottom wall 52*b* of insert 52 rests on work surface 70. The operator pushes downwardly on palm stapler 10 in the direction of arrow "D" (FIG. 14) so that the tips of the staple's legs 68*b*, 68*c* are placed in contact with or adjacent to work surface 70. The operator will continue to push palm stapler 10 downwardly toward work surface 70 while he or she engages the triggering mechanism.

As indicated earlier herein, sensor probe 66 is provided to detect if voltage is being carried by cables "C". If voltage is detected by sensor probe 66, a signal is relayed to first PCB 18 via first metal strip 44, second metal strip 46, and wiring 42. In response to receiving the signal, first PCB 18 will lock the triggering mechanism and prevent hammer 34 from moving downwardly to strike staple 68. If the operator wishes to install staple 68 regardless of the fact that current is flowing through cables "C", he or she will depress override button 30. Override button 30 is operatively engaged with first PCB 18. When override button 30 is depressed, the signal from first PCB 18 which locks the triggering mechanism will be canceled, i.e., overridden. As a consequence, the triggering mechanism will still function and staple 68 is able be installed by depressing trigger button 28*a*.

If sensor probe 66 does not detect voltage in cables "C", the triggering mechanism is not locked by first PCB 18. Consequently, when the operator depresses trigger button 28*a*, the circuit connecting motor 14 and hammer actuation mechanism 20 is closed and hammer actuation mechanism 20 will actuate the hammer 34. In particular, hammer actuation mechanism 20 rotates in the direction indicated by arrow "E" in FIG. 16 and a cam 20*a* on mechanism 20 will cause hammer 34 to move downwardly in the direction indicated by arrow "F". The downward movement of hammer 34 in the direction of arrow "F" causes tip 34*a* of hammer 34 to move through slot 48*g* and slot 52*h* until tip 34*a* strikes upper end 68*a* of staple 68. Spring 36 is compressed as hammer 34 moves downwardly in the direction of arrow "F". As hammer actuation mechanism 20 continues to rotate, the cam 20*a* thereof will move out of engagement with hammer 34 and spring 36 will cause hammer 34 to withdraw from slot 52*h* and slot 48*g* and return to its original position. Continued rotation of hammer actuation mechanism 20 will, once again, bring cam 20*a* into contact with hammer 34 and hammer 34 will again be caused to move downwardly in the direction of arrow "F" and strike staple 68. Hammer 34 will reciprocate within bore 32*c* and repeatedly strike upper end 68*a* of staple 68 as long as trigger button 28*a* is being depressed.

As staple 68 is driven into work piece 70 and the operator continues to push palm stapler 10 toward work surface 70, insert 52 pushes upwardly on plate 48 and thereby on the portion of second region 32*b* of barrel 32 engaged with plate 48. Second region 32*b* is thereby caused to telescope inwardly with respect to first region 32*a* so that the distance between work surface 70 and first region 32 of barrel 32 diminishes.

At about the same time hammer 34 reaches its full throw, sensor 38 on second region 32*b* of barrel 32 comes into alignment with sensor 37 on first region 32*a* of barrel 32. The alignment of sensors 38 and 37 causes a signal to be sent to first PCB 18 to deactivate hammer actuation mechanism 20. When hammer actuation mechanism 20 is deactivated, continued depression of trigger button 28*a* will have no effect. The operator will lift palm stapler off work surface 70 (in the opposite direction to arrow "D") and may insert another staple 68 for installation around cables "C" at another location on work surface 70.

FIGS. 17-20 show a second embodiment of an insert that is able to be used in the manner described above. The second embodiment of the insert in accordance with an aspect of the present disclosure is generally indicated at 152. Insert 152 is substantially identical in all aspects to insert 52 except for features that will be described hereafter.

Insert 152 has a top wall 152*a*, a bottom wall 152*b*, a first end 152*c*, a second end 152*d*, a first side 152*e*, and a second side 152*f*. Top wall 152*a* and bottom wall 152*b* are substantially parallel to each other and a vertical direction is defined between them. First end 152*c* and second end 152*d* are substantially parallel to each other and a longitudinal direction is defined between them. First side 152*e* and second side 152*f* are substantially parallel to each other and a lateral direction is defined between them.

Figure 20:
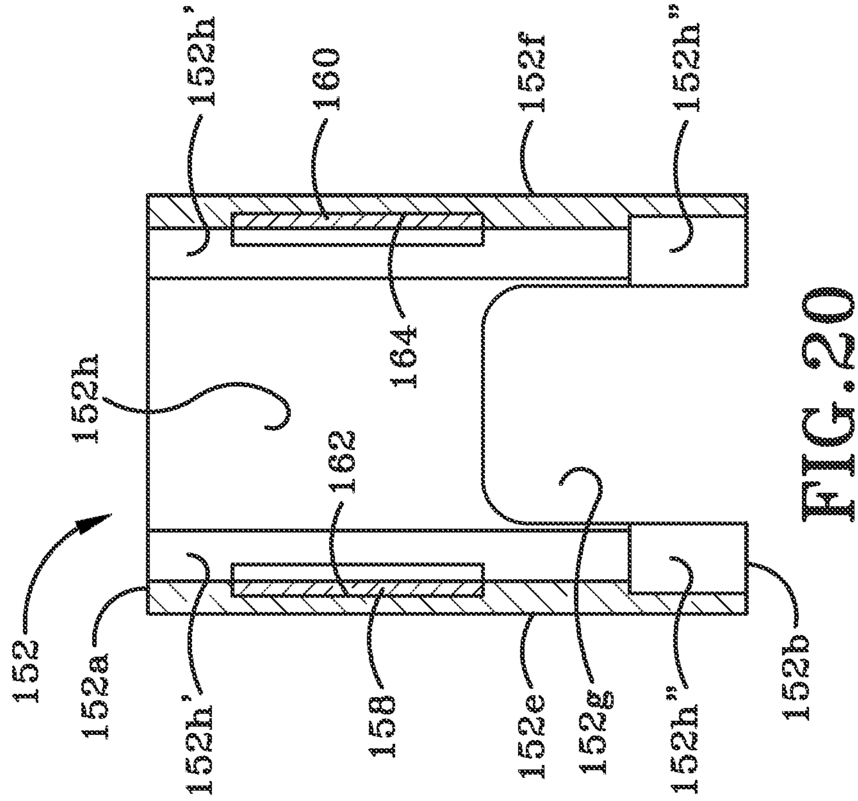
FIG. 20 is a transverse cross-section of the insert taken along line 20-20 of FIG. 17.

A groove 152*g* (FIG. 20) is defined in a lower region of insert 152. Groove 152*g* extends from first end 152*c* of insert 152 through to second end 152*d* thereof. Groove 152*g* is accessible through an opening defined in bottom wall 152*b* of insert 152. Groove 152*g* therefore extends longitudinally through insert. FIG. 20 shows that groove 152*g* is generally U-shaped when viewed from either of the first end 152*c* of insert 152 or the second end 152*d* thereof.

Insert 152 further defines a slot 152*h* therein. Slot 152*h* is generally vertically oriented and extends from top wall 152*a* through to groove 152*g*. Slot 152*h* extends laterally from a short distance inwardly from first side 152*e* of insert 152 to a short distance inwardly from second side 152*f* thereof. Slot 152*h* may be located generally midway between first end 152*c* and second end 152*d*. Slot 152*h* is oriented parallel to first end 152*c* and second end 152*d*. Slot 152*h* is positioned so that when plate 48 is located adjacent top wall 152*a*, slot 48*g* in plate 48 and slot 152*h* in insert 152 are substantially aligned with each other. In particular, when plate 48 is located adjacent top wall 152*a*, first end 48*c* of plate 48 is aligned with first end 152*c* of insert 152; second end 48*d* of plate 48 is aligned with second end 152*d* of insert 152; first side 48*e* of plate 148 is aligned with first side 152*e* of insert 152, and second side 48*f* of plate 148 is aligned with second side 152*f* of insert 152. Slots 48*g* and 152*h* may be of substantially the same length and of substantially the same width. When insert 152 is engaged in bore 32*c* of barrel 32, as will be described later herein, the aligned slots 48*g*, 152*h* permit a lower end 34*a* of hammer 34 to pass therethrough and into groove 152*g*.

Figure 17:
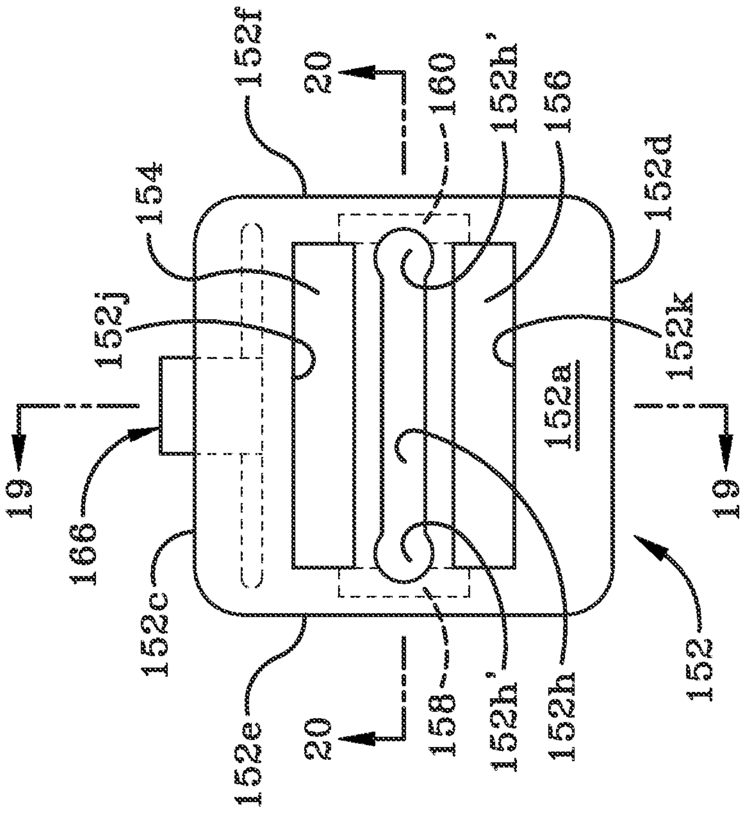
FIG. 17 is a top plan view of a second embodiment of an insert in accordance with an aspect of the present disclosure.

Insert 152 differs from insert 52 in that instead of simply having rounded end regions on slot 152*h*, slot 152*h* is provided with generally circular end regions 152*h*' (FIG. 17). Additionally, a lower region of slot 152*h* proximate bottom wall 152*b* of insert 152 is enlarged. This may be best seen in FIGS. 19 and 20. The enlarged bottom region of slot 152*h* is indicated by the reference character 152*h*". The purpose of the circular end regions 152*h*' and enlarged bottom region 152*h*" will be discussed later herein.

Figure 19:
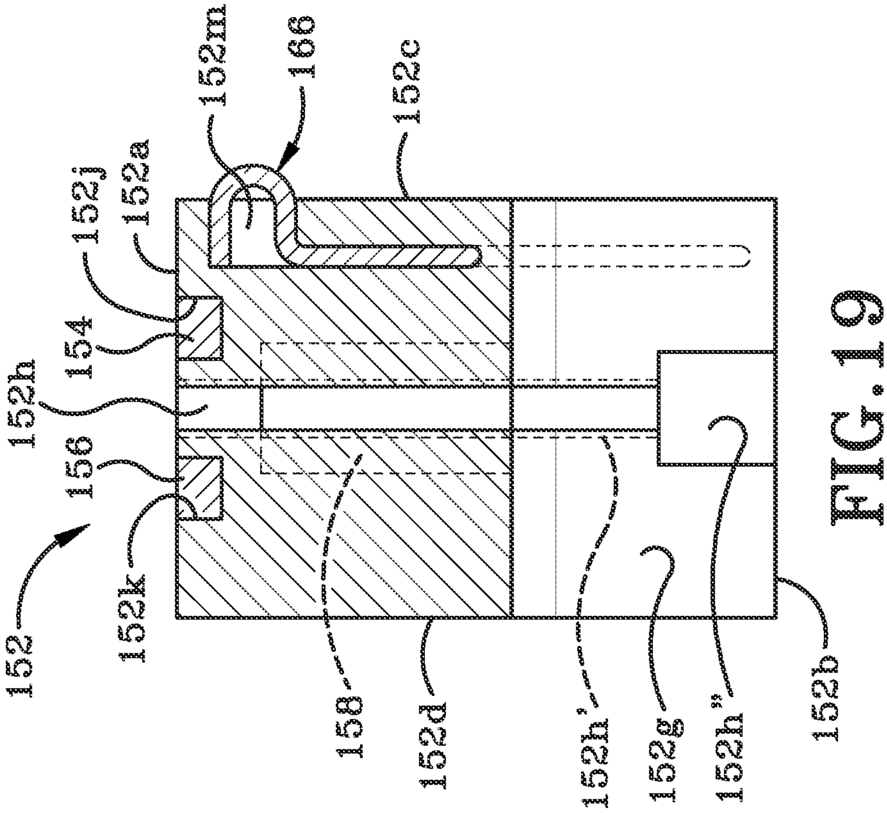
FIG. 19 is a longitudinal cross-section of the insert taken along line 19-19 of FIG. 17.

As best seen in FIG. 19, top wall 152*a* of insert 152 defines a first depression 152*j* and a second depression 152*k* therein. First depression 152*j* is oriented substantially parallel to slot 152*h* and is located between first end 152*c* and slot 152*h*. Second depression 152*k* is oriented substantially parallel to slot 152*h* and is located between second end 152*d* and slot 152*h*.

It will be understood that in other examples, first and second depressions 152*j*, 152*k* may be shaped and located differently from what is illustrated in the attached figures. Additionally, only one depression or more than two depressions may be defined in top wall 152*a*. 152*a*.

A retainer mechanism is provided to keep insert 152 within bore 32*c* of barrel 32. The retainer mechanism as disclosed herein includes a first magnet 154 that is engaged in first depression 152*j* of insert 152 and a second magnet 156 that is engaged in second depression 152*k* of insert 152. First magnet 154 and second magnet 156 are consequently located on opposite sides of slot 152*h* and are oriented substantially parallel to slot 152*h*. If depressions 152*j*, 152*k* are differently shaped or located in other positions on top wall 152*a*, or if there is only one depression or more than two depressions, a magnet complementary to the provided depression(s) will be provided.

When insert 152 is positioned within bore 32*c* of barrel 32, first and second magnets 154, 156 are magnetically attracted to plate 48 and this magnetic attraction keeps insert 152 engaged with plate 48. The magnetic attraction between insert 152 and plate 148 keeps insert 152 retained within bore 32*c* of palm stapler 10 unless and until an operator pulls insert 152 downwardly in a direction out of bore 32*c* and thereby breaks the magnetic attraction between insert 152 and plate 48.

As best seen in FIGS. 17 and 20, insert 152 is provided with a holding mechanism in the form of a third magnet 158 and a fourth magnet 160 that are each positioned proximate one end of slot 152*h*. Third and fourth magnets 158, 160 are located in recesses 162, 164, respectively. Third magnet 158 is located between a first end of slot 152*h* and first side 152*e* of insert. Fourth magnet 160 is located between a second end of slot 152*h* and second side 152*f* of insert 152. Third and fourth magnets 158, 160 are provided to hold a fastener in a correct position and orientation within slot 152*h*, as will be later described herein.

First end 152*c* of insert 152 further defines an aperture 152*m* therein. Aperture 152*m* (FIG. 19) is located a distance downwardly from top wall 152*a* of insert 152 and may be positioned approximately midway between first side 152*e* and second side 152*f* of insert 152. A sensor probe 166 is provided in insert 152. Sensor probe 166 has an identical structure and function to sensor probe 66.

Figure 20B:
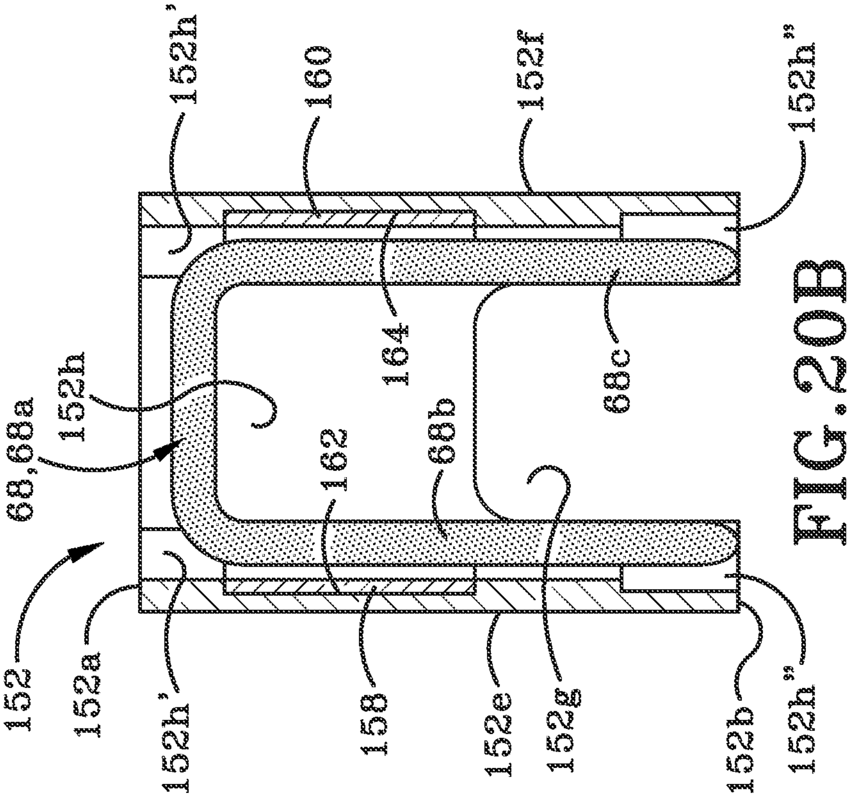
FIG. 20B is a transverse cross-section of the insert showing a staple engaged in the insert.
Figure 20A:
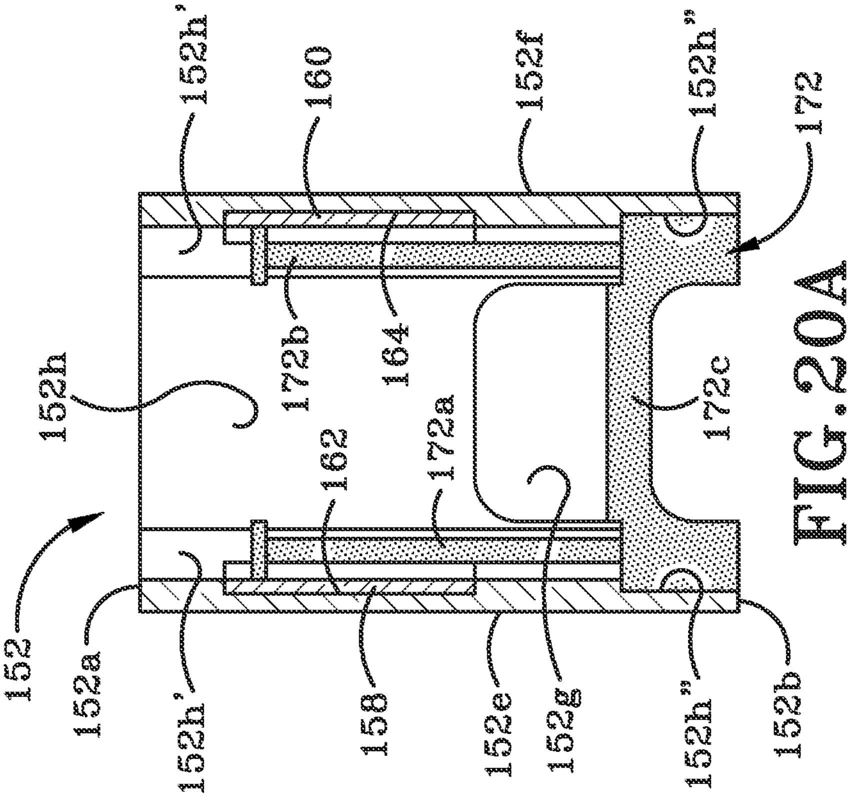
FIG. 20A is a transverse cross-section of the insert showing a bridge nail engaged in the insert.
Figure 22:
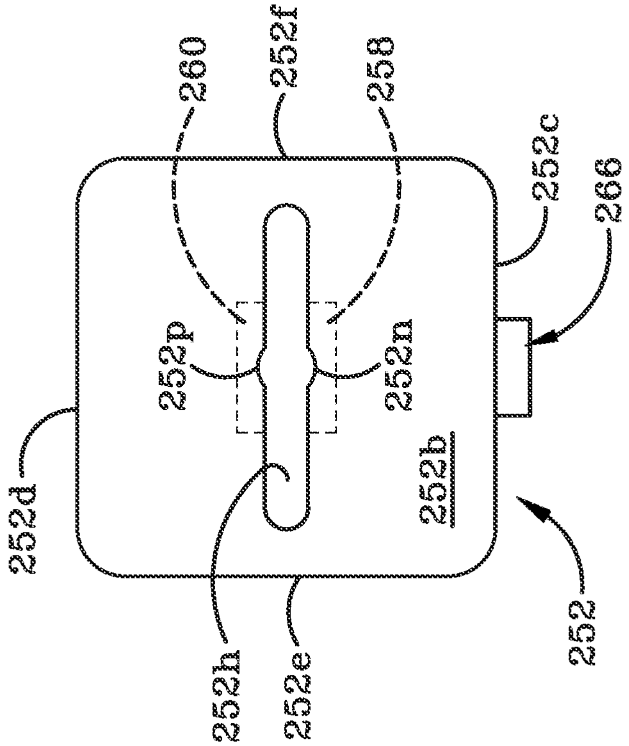
FIG. 22 is a bottom plan view of the insert of FIG. 21.
Figure 21:
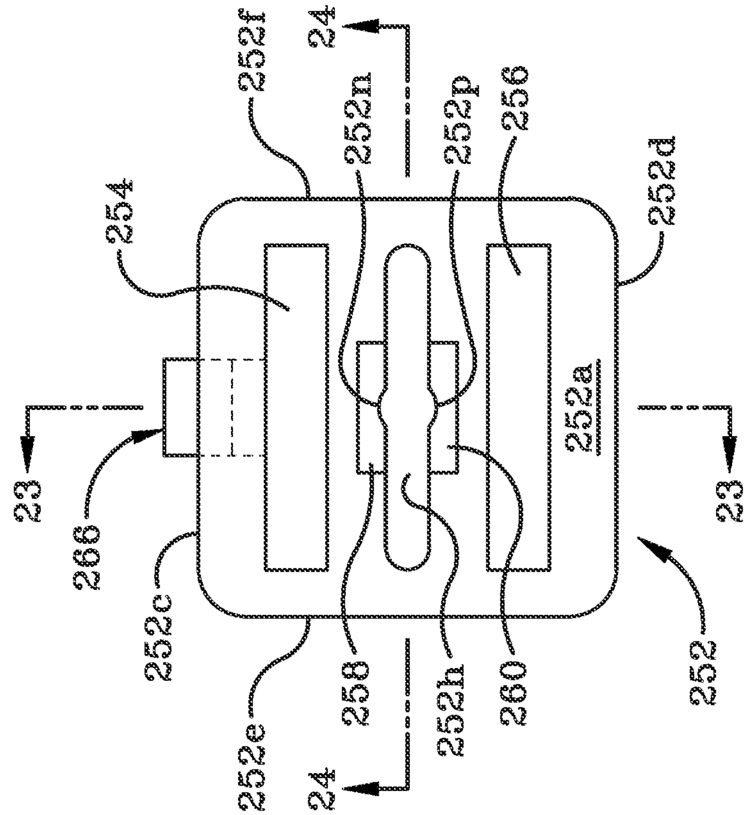
FIG. 21 is a top plan view of a third embodiment of an insert in accordance with an aspect of the present disclosure.

FIG. 20A shows that insert 152 is able to receive a cable clip 172 therein. Cable clip 172 includes a pair of nails 172*a*, 172*b* and a plastic bridge 172*c* that connects the two nails 172*a*, 172*b*. Cable clip 172 is placed in insert 152 in the same manner as staple 68 is engaged with insert 52. The configuration of slot 152*h* in insert 152 is such that nails 172*a*, 172*b* may be seated within the circular regions 152*h*' of slot 152*h* and bridge 172*c* may be seated within enlarged region 152*h*". Third and fourth magnets 158, 160 help to hold the nails 172*a*, 172*b* of cable clip 172 in the correct position and orientation within insert 152.

When insert 152 is seated within bore 32*c* of barrel 32 of palm stapler 10, the U-shaped bridge 172*c* of cable clip 172 may be placed over a cable "C" on a work surface 70. When hammer 34 is actuated, tip 34*a* of hammer 34 will strike the heads of nails 172*a*, 172*b* and knock the same downwardly and into the work surface 70 until the heads of the nails 172*a*, 172*b* are adjacent a top end of bridge 172*c*. The operation of palm stapler 10 using insert 152 is substantially identical to the operation of palm stapler 10 using insert 52 as previously described herein.

As is evident from FIG. 20B, insert 152 may also be utilized to install a staple 68. Staple 68 may be held in place by third and fourth magnets 158, 160 and staple 68 may be installed in the same manner as described with respect to insert 52.

FIGS. 21-24A show a third embodiment of an insert that is able to be used in the same manner as has been described above. The third embodiment of the insert in accordance with an aspect of the present disclosure is generally indicated at 252. Insert 252 is substantially identical in all aspects to insert 52 except for features that will be described hereafter.

Insert 252 has a top wall 252*a*, a bottom wall 252*b*, a first end 252*c*, a second end 252*d*, a first side 252*e*, and a second side 252*f*. Top wall 252*a* and bottom wall 252*b* are substantially parallel to each other and a vertical direction is defined between them. First end 252*c* and second end 252*d* are substantially parallel to each other and a longitudinal direction is defined between them. First side 252*e* and second side 252*f* are substantially parallel to each other and a lateral direction is defined between them.

Figure 23:
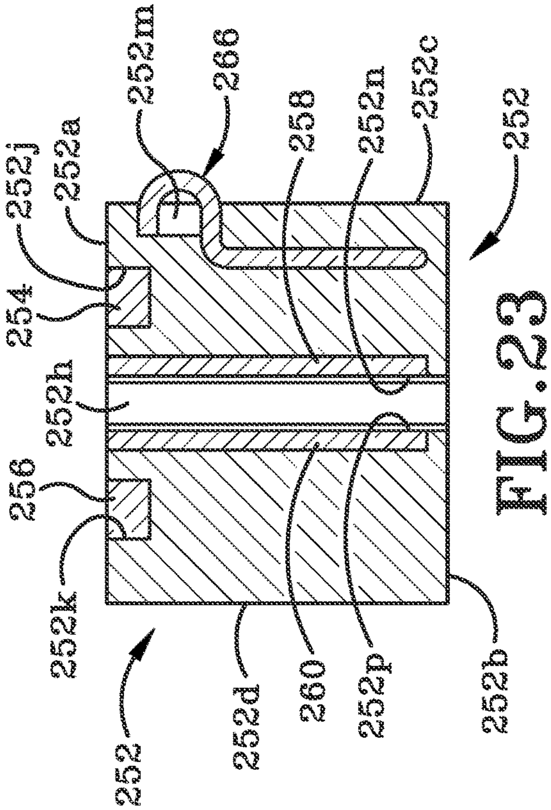
FIG. 23 is a longitudinal cross-section of the insert taken along line 23-23 of FIG. 21.
Figure 24A:
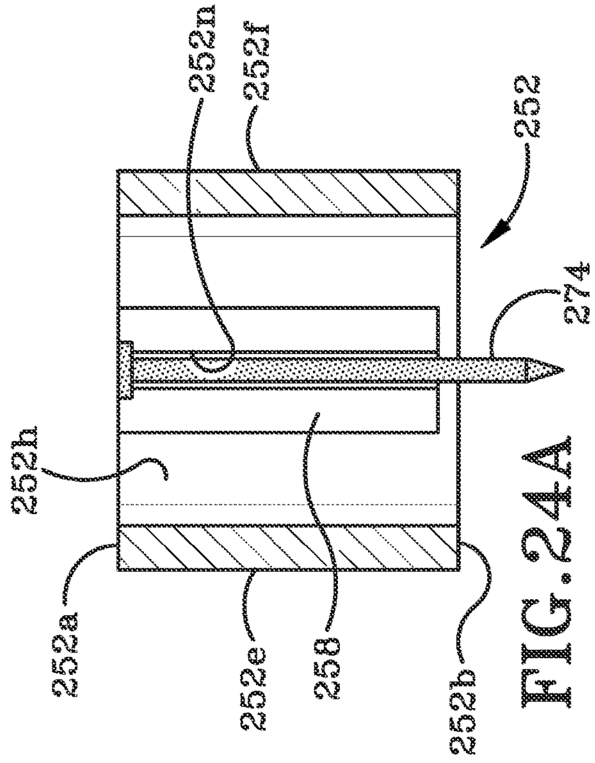
FIG. 24A is a transverse cross-section of the insert showing a nail engaged therewith.
Figure 24:
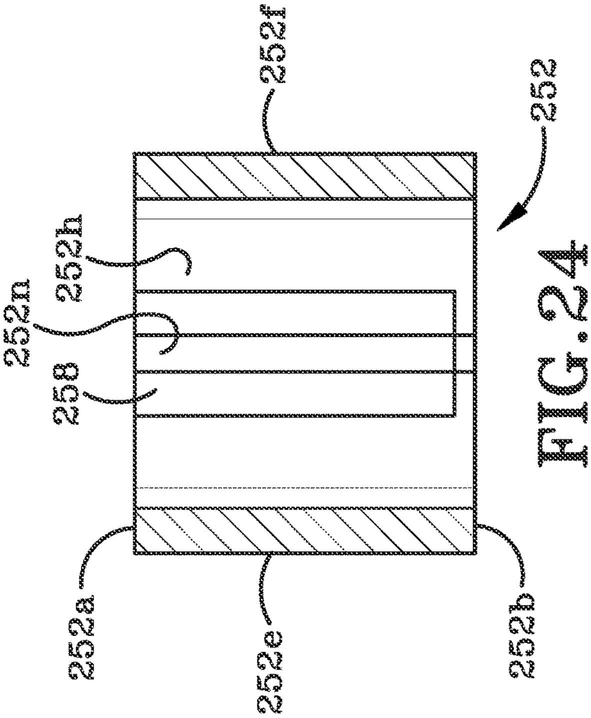
FIG. 24 is a transverse cross-section of the insert taken along line 24-24 of FIG. 21.
Figure 26:
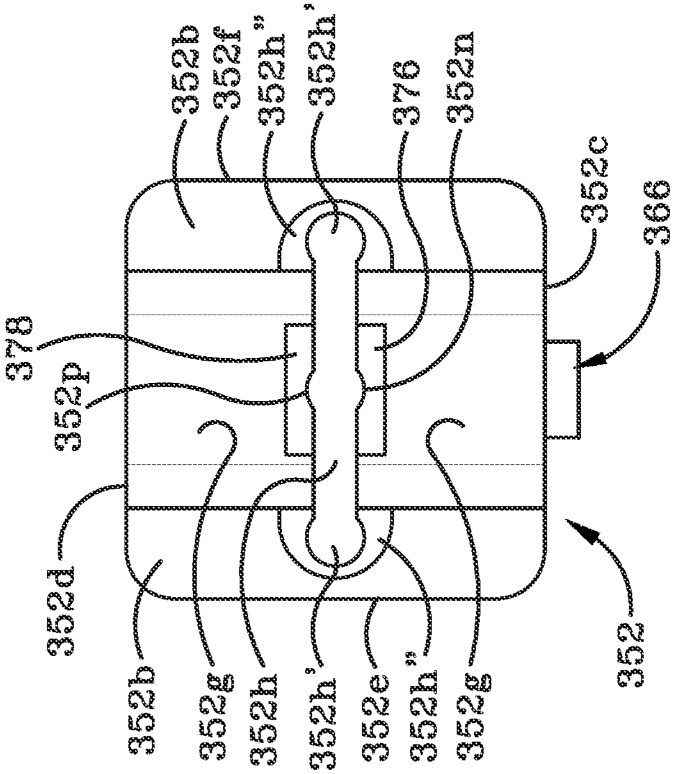
FIG. 26 is a bottom plan view of the insert of FIG. 25.

As is evident from FIGS. 23-24A, insert 252 is shorter than either of insert 52 and insert 152. Additionally, insert 252 does not include a groove similar to either of the grooves 52*g* and 152*g*.

Insert 252 does, however, define a slot 252*h* therein. Slot 252*h* is generally vertically oriented and extends from top wall 252*a* of insert 252 through to bottom wall 252*b* thereof. Slot 252*h* extends laterally from a short distance inwardly from first side 252*e* of insert 252 to a short distance inwardly from second side 252*f* thereof. Slot 252*h* may be located generally midway between first end 252*c* and second end 252*d*. Slot 252*h* is oriented parallel to first end 252*c* and second end 252*d*. Slot 252*h* is located so that when plate 48 is located adjacent top wall 252*a*, slot 48*g* in plate 48 and slot 252*h* in insert 252 are substantially aligned with each other. In particular, when plate 48 is located adjacent top wall 252*a*, first end 48*c* of plate 48 is aligned with first end 252*c* of insert 252; second end 48*d* of plate 48 is aligned with second end 252*d* of insert 252; first side 48*e* of plate 48 is aligned with first side 252*e* of insert 252, and second side 48*f* of plate 48 is aligned with second side 252*f* of insert 252. Slots 48*g* and 252*h* may be of substantially the same length and of substantially the same width. When insert 252 is engaged in bore 32*c* of barrel 32, as will be described later herein, the aligned slots 48*g*, 252*h* permit a lower end 34*a* of hammer 34 to pass therethrough.

Slot 252*h* is substantially similar to slot 52 except it additionally includes cut-out regions 252*n*, 252*p*. As a consequence, slot 252*h* is substantially identical in configuration to the slot 48*g*' of plate 48B shown in FIG. 5. Insert 252 may be utilized with either of plates 48A and 48B but may be particularly suited for use in association with plate 48B.

As best seen in FIG. 23, top wall 252*a* of insert 252 defines a first depression 252*j* and a second depression 252*k* therein. First and second depressions 252*j*, 252*k* are substantially identical in structure, function and placement to first and second depressions 52*j*, 52*k*, and 152*j*, 152*k*. A retainer mechanism is provided to keep insert 252 within bore 32*c* of barrel 32. The retainer mechanism as disclosed herein includes a first magnet 254 that is engaged in first depression 252*j* of insert 252 and a second magnet 256 that is engaged in second depression 252*k* of insert 252. First and second magnets 254, 256 are substantially identical in structure, function, and placement to first and second magnets 54, 56 and 154, 156.

Insert 252 is provided with a holding mechanism for holding a fastener in the correct position to be struck by the hammer 34 and driven into the work piece. The holding mechanism in insert 252 is disclosed as being a third magnet 258 and a fourth magnet 260 that are positioned on either end of slot 252*h*. Unlike magnets 58, 60 and 158, 160 however, third and fourth magnets 258, 260 are located substantially parallel to slot 252*h* and to first and second ends 152*c*, 152*d*. Furthermore, third and fourth magnets 258, 260 are located proximate cut-outs 252*n*, 252*p* in a central region of slot 252*h* and the magnets extend along a portion of the length of slot 252*h*. (Magnets 58, 60 and 158, 160, on the other hand, are located proximate the rounded ends of the respective slot 52*h*, 152*h*. Magnets 58, 60 and 158, 160 are also oriented substantially at right angles to slot 52*h*, 152*h* and parallel to first and second sides 52*e*, 52*f* or 152*e*, 152*f*.) The placement of third and fourth magnets 258, 260 is such that they circumscribe a portion of slot 252*h* that will hold a fastener such as the nail 274 shown in FIG. 24A. In particular, nail 274 will be received in the generally circular region created by cut-outs 252*n*, 252*p*. The provision of third and fourth magnets 258, 260 therefore helps to hold nail 274 substantially vertically in slot 252*h*. Since insert 252 is shorter than insert 52 or insert 152, a lower end and tip of nail 274 may extend downwardly and outwardly beyond bottom wall 252*b* of insert 252.

First end 252*c* of insert 252 may further define an aperture 252*m* (FIG. 23) therein. Aperture 252*m* is located a distance downwardly from top wall 252*a* of insert 252 and may be located approximately midway between first side 252*e* and second side 252*f* thereof. A sensor probe 266 may be provided in insert 252 and may be utilized for the same purpose as sensor probe 66. The structure of sensor probe 266 is different to the structure of sensor probe 66 because insert 252 is shorter than inserts 52, 152 and because there are no grooves in insert 252 like the grooves 52*g*, 152*g* provided in inserts 52 and 152, respectively. (It will be understood that in other embodiments, sensor probe 266 may be omitted from insert 252.)

When insert 252 is seated within bore 32*c* of barrel 32 of palm stapler 10, nail 274 may inserted into slot 252*h* and will held in place by third and fourth magnets 258, 260. When hammer 34 is actuated, tip 34*a* of hammer 34 will strike the head of nail 274 and will knock nail 274 downwardly into the work surface until the head of the nail 274 is substantially adjacent work surface. The actual operation of palm stapler 10 using insert 252 is substantially identical to the use of palm stapler 10 with insert 52 or 152 and therefore will not be further described herein.

FIGS. 25-28 show a fourth embodiment of an insert that is able to be used in a similar manner to the inserts 52, 152, and 252 described above. The fourth embodiment of the insert in accordance with an aspect of the present disclosure is generally indicated at 352. Insert 352 is substantially identical in all aspects to insert 52 except for features that will be described hereafter.

Insert 352 has a top wall 352*a*, a bottom wall 352*b*, a first end 352*c*, a second end 352*d*, a first side 352*e*, and a second side 352*f*. Top wall 352*a* and bottom wall 352*b* are substantially parallel to each other and a vertical direction is defined between them. First end 352*c* and second end 352*d* are substantially parallel to each other and a longitudinal direction is defined between them. First side 352*e* and second side 352*f* are substantially parallel to each other and a lateral direction is defined between them.

Figure 28:
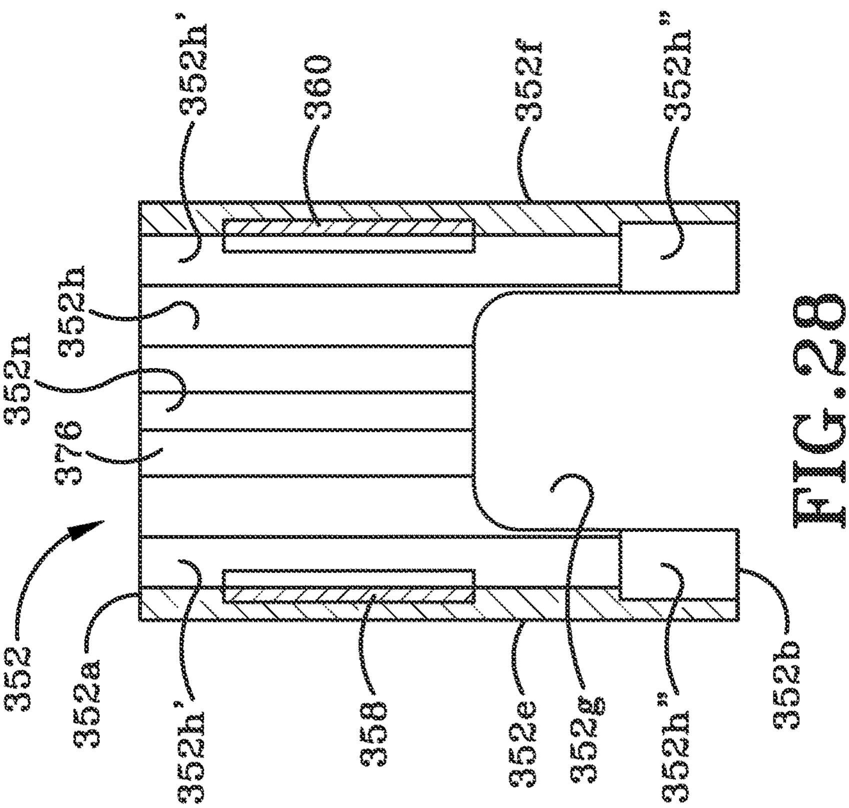
FIG. 28 is a transverse cross-section of the insert taken along line 28-28 of FIG. 25.
Figure 27:
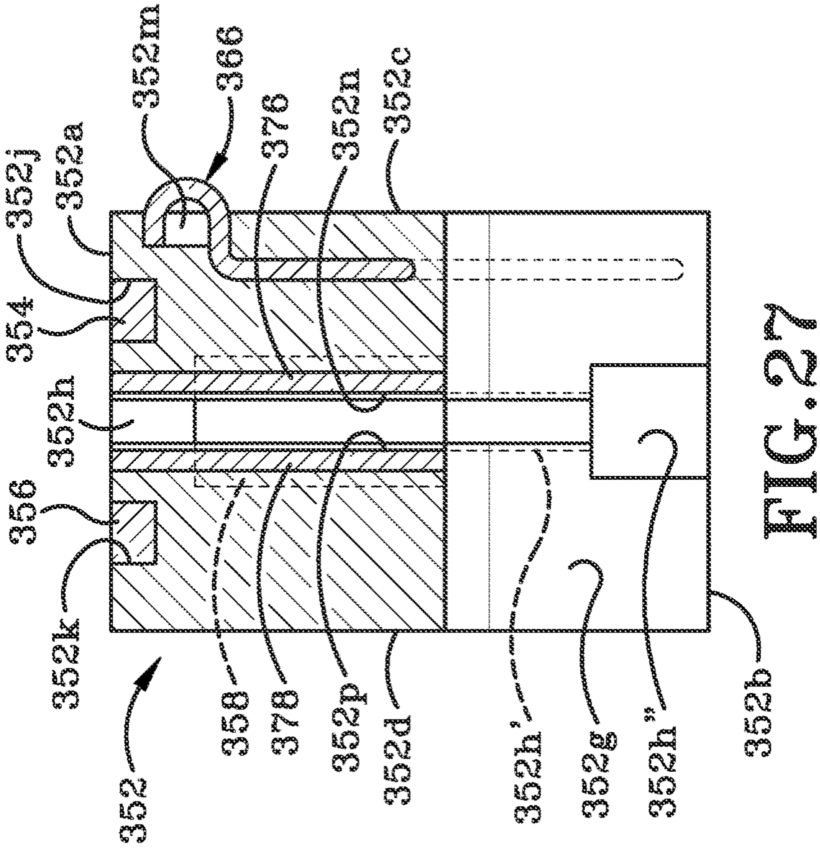
FIG. 27 is a longitudinal cross-section of the insert taken along line 27-27 of FIG. 25.

A lower region of insert 352 defines a groove 352*g* (FIG. 28) therein. Groove 352*g* extends from first end 352*c* of insert 352 through to second end 352*d* thereof and is accessible through an opening defined in bottom wall 352*b*. Groove 352*g* therefore extends longitudinally through insert. FIG. 28 shows that groove 352*g* is generally U-shaped when viewed from either of the first end 352*c* of insert 352 or the second end 352*d* thereof. The structure and function of groove 352*g* is substantially identical to that of grooves 52 and 152.

Insert 352 defines a slot 352*h* therein. Slot 352*h* is generally vertically oriented and extends from top wall 352*a* of insert 352 through to groove 352*g*. Slot 352*h* extends laterally from a short distance inwardly from first side 352*e* of insert 352 to a short distance inwardly from second side 352*f* thereof. Slot 352*h* may be located generally midway between first end 352*c* and second end 352*d* and is oriented parallel to first end 352*c* and second end 352*d*. Slot 352*h* is located so that when plate 48 is located adjacent top wall 352*a*, slot 48*g* in plate 48 and slot 352*h* in insert 352 are substantially aligned with each other. In particular, when plate 48 is located adjacent top wall 352*a*, first end 48*c* of plate 48 is aligned with first end 352*c* of insert 352; second end 48*d* of plate 48 is aligned with second end 352*d* of insert 352; first side 48*e* of plate 48 is aligned with first side 352*e* of insert 352, and second side 48*f* of plate 48 is aligned with second side 352*f* of insert 352. Slots 48*g* and 352*h* may be of substantially the same length and of substantially the same width. When insert 352 is engaged in bore 32*c* of barrel 32 of palm stapler 10, as will be described later herein, the aligned slots 48*g*, 352*h* permit a lower end 34*a* of hammer 34 to pass therethrough as hammer 34 is moved downwardly to strike a fastener.

Insert 352 differs from insert 52 in that instead of simply having rounded end regions on slot 352*h*, slot 352*h* is provided with generally circular end regions 352*h*' (FIG. 25) that are substantially identical to circular end regions 152*h*'. Additionally, a lower region of slot 352*h* proximate bottom wall 352*b* is enlarged. This may be best seen in FIGS. 27 and 28. The enlarged bottom region of slot 352*h* is indicated by the reference character 352*h*" and is substantially identical to enlarged bottom region 152*h*" of insert 152. The structure and function of the circular end regions 352*h*' and enlarged bottom region 352*h*" are substantially identical to the end regions 152*h*' and bottom region 152*h*" of insert 152 discussed earlier herein.

Slot 352*h* is substantially similar to slot 52 except it additionally includes cut-out regions 352*n*, 352*p* that are substantially identical to cut-out regions 252*n*, 252*p*. Insert 352 may be utilized with either of plates 48A and 48B. An alternative plate (not shown) may be used with insert 352 where that plate is substantially identical to plate 48A but instead of slot 48*g*, the alternative plate will have a slot that is substantially identical in configuration to slot 352*h*.

As best seen in FIG. 23, top wall 352*a* of insert 352 defines a first depression 352*j* and a second depression 352*k* therein. First and second depressions 352*j*, 352*k* are substantially identical in structure, function and placement to first and second depressions 52*j*, 52*k*; 152*j*, 152*k*, and 252*j*, 252*k*. A retainer mechanism is provided to keep insert 352 within bore 32*c* of barrel 32. The retainer mechanism as disclosed herein includes a first magnet 354 that is engaged in first depression 352*j* of insert 352 and a second magnet 356 that is engaged in second depression 352*k* of insert 352. First and second magnets 354, 356 are substantially identical in structure, function, and placement to first and second magnets 54, 56; 154, 156; and 254, 256.

Figure 25:
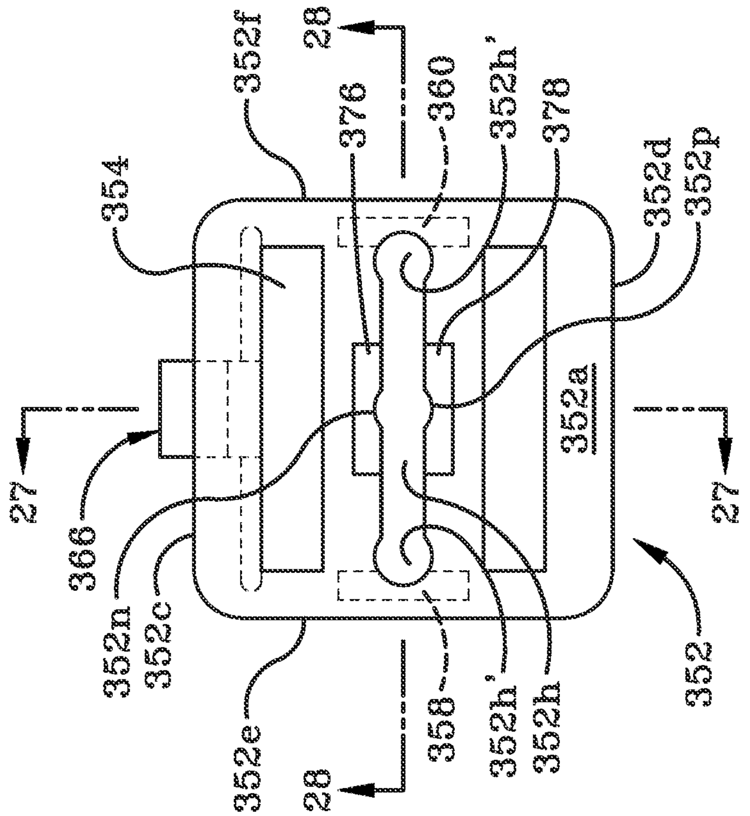
FIG. 25 is a top plan view of a fourth embodiment of an insert in accordance with an aspect of the present disclosure.

As best seen in FIGS. 25 and 28, insert 352 is also provided with a holding mechanism that serves the same purpose as the previously described holding mechanisms. Holding mechanism in insert 352 may comprise a third magnet 358 and a fourth magnet 360 that are positioned at each end of slot 352*h* and are located in recesses 362, 364, respectively. Third magnet 358 is located between a first end of slot 352*h* and first side 352*e* of insert. Fourth magnet 360 is located between a second end of slot 352*h* and second side 352*f* of insert 352. Third and fourth magnets 358, 360 are provided to hold a cable clip (such as cable clip 172 shown in FIG. 20A or a staple 68 shown in FIG. 20B) in a correct position within slot 352*h*, as will be later described herein. Third and fourth magnets 358, 360 are identical in structure and function to third and fourth magnets 158, 160.

In insert 352 the holding mechanism also includes a fifth magnet 376 and a sixth magnet 378 that are positioned on either end of slot 352*h*. Fifth and sixth magnets 376 378 are substantially identical in structure and function and placement within insert 352 as third magnet 258 and fourth magnet 260 in insert 252. In other words, the placement of fifth and sixth magnets 376, 378 is such that they circumscribe a portion of slot 352*h* that will hold a fastener, such as the nail 274 shown in FIG. 24A. In particular, nail 274 will be received in the generally circular region created by cut-outs 352*n*, 352*p*. The provision of fifth and sixth magnets 376, 378 therefore helps to hold nail 274 substantially vertically within slot 352*h.*

First end 352*c* of insert 352 may further define an aperture 352*m* (FIG. 23) therein. Aperture 352*m* is located a distance downwardly from top wall 352*a* of insert 352 and may be located approximately midway between first side 352*e* and second side 352*f* of insert 352. A sensor probe 366 may be provided in insert 352 and may be of the same structure as sensor probe 66 and be utilized for the same purpose as sensor probe 66.

Insert 352 is configured to be able to hold any one of a variety of different fasteners. In particular, insert 352 is configured to be able to hold any one of a staple, a cable clip, and a nail therein. It will be understood that the cable clip can include one or two nails.

When insert 352 is seated within bore 32*c* of barrel 32 of palm stapler 10, the desired fastener (staple, cable clip or nail) may inserted into slot 352*h* and will be held in place by third and fourth magnets 358, 360; and/or fifth and sixth magnets 376, 378. When hammer 34 is actuated by depressing trigger button 28*a*, hammer 34 will move downwardly and cause tip 34*a* of hammer 34 to strike an uppermost region of the fastener held by insert 352. Repeated blows by hammer 34 will drive the fastener retained in insert 352 into the work surface 70. This downward driving of the fastener by the hammer 34 will continue until the sensors 37, 38 align and the hammer actuation mechanism 20 is deactivated. The actual operation of palm stapler 10 using insert 352 is substantially identical to the use of palm stapler 10 with any of inserts 52, 152, and 252.

Figure 29:
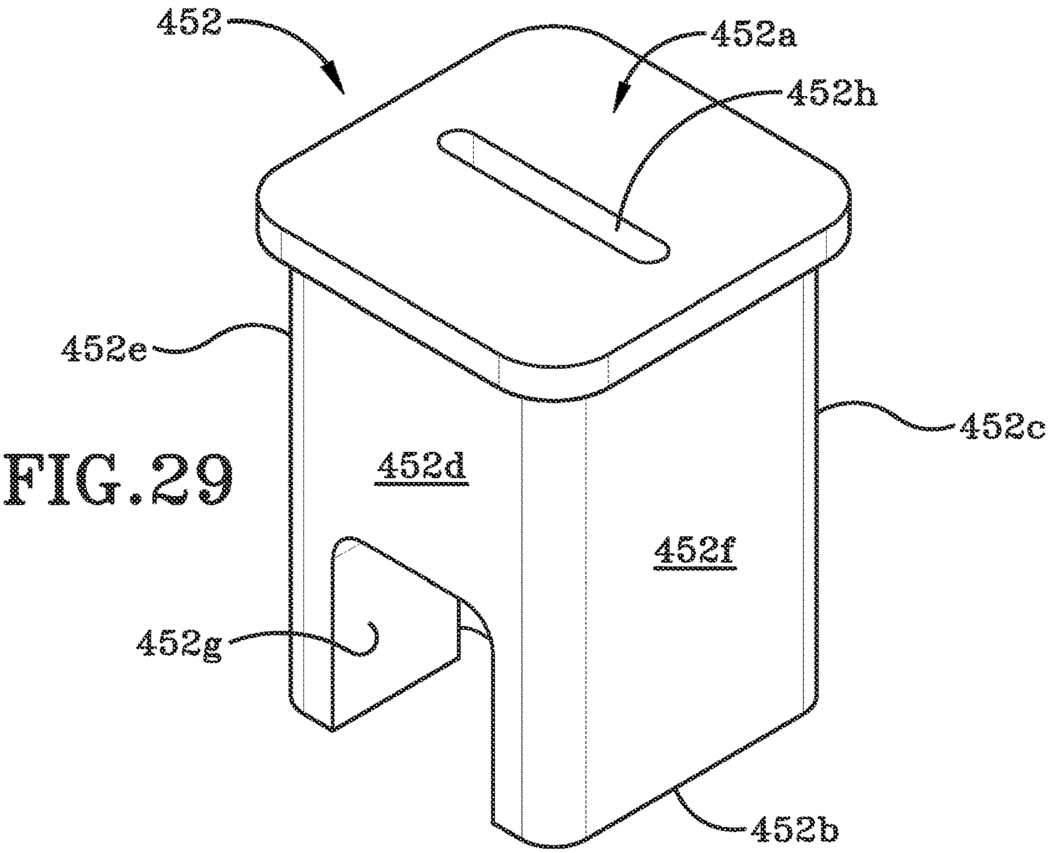
FIG. 29 is a front, top isometric view of a fifth embodiment of an insert in accordance with an aspect of the present disclosure.
Figure 30:
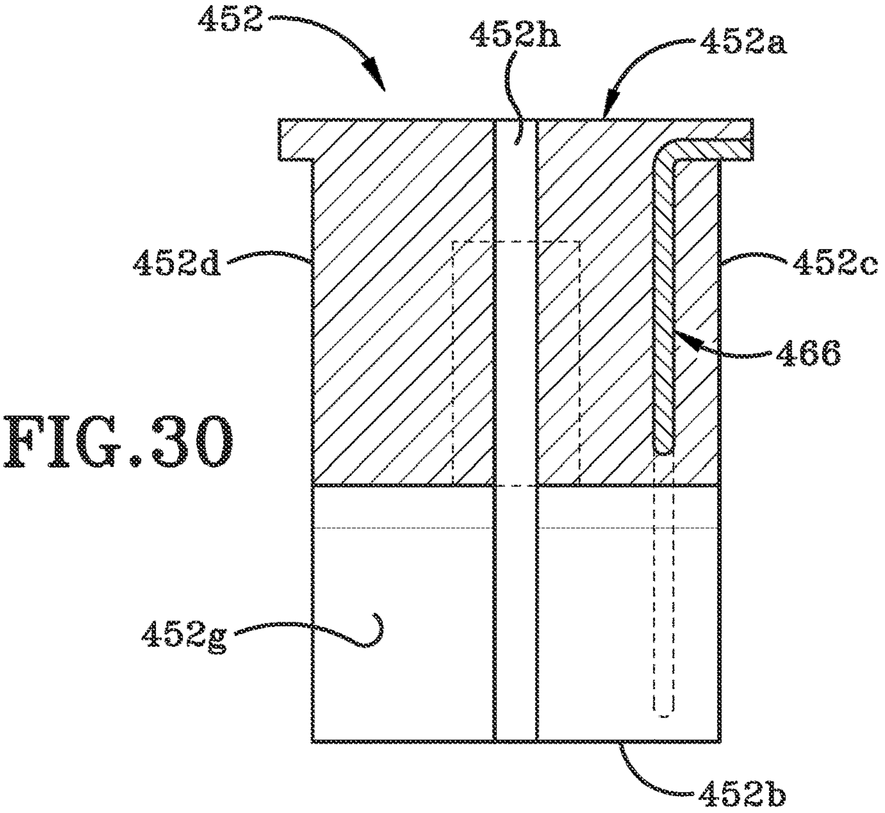
FIG. 30 is a longitudinal cross-section of the insert of FIG. 29.

FIGS. 29 and 30 show a fifth embodiment of an insert in accordance with an aspect of the present disclosure, generally indicated at 452. Insert 452 differs from the previous embodiments of insert in that instead of the plate 48 being separate from the insert, the plate is integral therewith. In other words, the top wall of the associated previously described embodiments of insert 52, 152, 252, 352 is omitted, and the plate forms the top plate 452*a* of insert 452. The top plate 452*a* is located at an opposite end of the insert 452 from bottom wall 452*b*. Top plate 452*a* extends outwardly beyond each of the first end 452*c*, second end 452*d*, first side 452*e*, and second side 452*f.* Insert 452 defines a slot 452*g* that is substantially identical in structure and function of slot 52*g*. Insert 452*g* further defines a slot 452*h* that is substantially identical in structure and function to slot 52*h*. It will be understood that magnets that are substantially identical in structure and function to third and fourth magnets 58, 60 may be provided in insert 452 but magnets that are similar to first and second magnets 54, 56 are omitted from insert 452.

A sensor probe 466 may be provided in insert 452. The sensor probe may extend all the way upwardly to a side wall of the top plate 452*a* to ensure that electrical contact is made with the first metal strip 44 in palm stapler 10. Other than the configuration of the uppermost end of probe 466, the rest of the probe is substantially identical in structure and function to sensor probe 66.

It will be understood that different configurations of slot 452*h* may be defined in top plate 452. Any of the configurations of slots 52*h*, 152*h*, 252*h*, and 352*h* may be utilized. Any of the other features of the previously described embodiments may be incorporated into insert 452 (such as fifth and sixth magnets) so that insert 452 may be able to be used with any described type of fastener.

It will be understood by those of skill in the art that other examples of insert may be specifically configured to receive fasteners with shapes other than those described herein. In other words, cut-out regions may be provided to accommodate features of these differently configured fasteners. Additionally, magnets may be positioned differently from what is disclosed herein to accommodate differently shaped fasteners from those described herein. The slots defined in the top wall of the insert and the plate (or defined in the integral top plate) may be differently positioned and shaped to permit differently configured hammers to move therethrough.

It will be understood that instead of providing the voltage sensor probe 66 on any of the disclosed inserts, in other examples, the voltage sensor probe may be provided on any other suitable component part of the housing 12 of palm stapler 10. In particular, the voltage sensor probe may be provided on barrel 32 itself.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An insert for selective engagement with a palm stapler; said insert comprising:

a body having an exterior surface adapted to be complementary to a portion of a bore defined in the palm stapler;

the body including:

a top wall;

an opposing bottom wall;

a side wall extending between the top wall and the bottom wall;

a slot defined in the body, wherein the slot extends from a first opening defined in a first region of the exterior surface in the top wall to a second opening defined in a second region of the exterior surface in the bottom wall;

wherein the slot is configured to receive at least one fastener therein for installation in a workpiece;

a holding mechanism provided on the body;

wherein said holding mechanism is configured to hold the at least one fastener in the slot in a position where the at least one fastener is able to be struck by a hammer of the palm stapler; and a sensor probe provided on the body, wherein the sensor probe is adapted to detect voltage in a wire on a work surface into which the at least one fastener is to be installed;

wherein a part of the sensor probe extends for a distance outwardly beyond the side wall of the body.

2. The insert according to claim 1, further comprising a retainer mechanism provided on the body, said retainer mechanism being adapted to interact with a cooperating retainer member provided on the palm stapler to hold the insert within the bore.

3. The insert according to claim 2, wherein the retainer mechanism comprises at least one magnet provided on the body, said at least one magnet being configured to interact with a cooperating magnet provided on the palm stapler.

4. The insert according to claim 3, further comprising at least one depression defined in the first region of the insert, wherein the at one magnet is received within the at least one depression.

5. The insert according to claim 4, wherein the at least one depression comprises a first depression and a second depression defined in the first region of the body, wherein the at least one magnet comprises a first magnet received within the first depression and a second magnet received within the second region.

6. The insert according to claim 5, wherein the first opening to the slot is defined between the first depression and the second depression.

7. The insert according to claim 6, wherein the first opening, the first depression and the second depression are substantially parallel to one another and to a longitudinal axis of the body, wherein the longitudinal axis extends between the first region and the second region of the body.

8. The insert according to claim 1, wherein the slot is configured to be complementary to the at least one fastener.

9. The insert according to claim 1, wherein, when the slot is viewed from a direction looking towards the first region of the body, the slot includes a first end proximate a first area of a side wall of the body and an opposed second end proximate an opposed second area of the side wall; wherein the slot extends laterally between the first end and the second end; and wherein each of the first end and the second end of the slot is generally circular in configuration and is enlarged relative to a width of the slot.

10. The insert according to claim 1, wherein, when the slot is viewed from a direction looking towards the first region of the body, the slot includes a first end proximate a first area of a side wall of the body and an opposed second end proximate an opposed second area of the side wall; wherein the slot extends laterally between the first end and the second end; and wherein the slot includes a region of enlarged width in a location intermediate the first end and the second end thereof.

11. The insert according to claim 1, wherein the slot is oriented parallel to a direction of travel of the hammer when the body is received within the bore of the palm stapler.

12. The insert according to claim 1, wherein the holding mechanism includes at least one magnet located proximate the side wall of the body.

13. The insert according to claim 12, wherein the at least one magnet comprises a first magnet located adjacent a first area of the side wall and a second magnet located adjacent an opposed second area of the side wall.

14. The insert according to claim 12, wherein the first magnet and the second magnet are arranged parallel to a longitudinal axis of the body, wherein the longitudinal axis extends between the top wall and the bottom wall of the body; and wherein each of the first magnet and the second magnet originates a distance inwardly from the top wall of the body.

15. The insert according to claim 1, wherein the sensor probe is configured to be electrically connected to a processor of the palm stapler when the body of the insert is engaged within the bore of the palm stapler.

16. The insert according to claim 1, wherein the side wall includes a first side wall region and an opposed second side wall region; and the body includes:

a groove defined partially in the first side wall region and the second side wall region, and partially in the bottom wall of the body;

wherein the groove is adapted to receive at least one electrical cable therethrough, wherein the at least one electrical cable extends through the portion of the groove defined partially in each of the first side wall region and the second side wall region;

and wherein the groove is in communication with the slot.

17. The insert according to claim 16, wherein the sensor probe comprises:

a first sensor probe region which extends outwardly through an aperture defined in the side wall of the body;

a second sensor probe region that extends downwardly from the first sensor probe region to a location a short distance above the groove;

a third sensor probe region and a fourth sensor probe region which extend in opposite directions from the second sensor probe region; and wherein the third sensor probe region extends around a first part of the groove and the fourth sensor probe region extends around a second part of the groove.

* * * * *